US009262060B1

(12) United States Patent
Torgerson

(10) Patent No.: US 9,262,060 B1
(45) Date of Patent: *Feb. 16, 2016

(54) METHOD AND APPARATUS FOR PERFORMING VIEWMARKING

(71) Applicant: THE MATHWORKS, INC., Natick, MA (US)

(72) Inventor: Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/970,196

(22) Filed: Aug. 19, 2013

Related U.S. Application Data

(63) Continuation of application No. 11/873,166, filed on Oct. 16, 2007, now Pat. No. 8,516,384.

(60) Provisional application No. 60/852,603, filed on Oct. 17, 2006.

(51) Int. Cl.
*G06F 3/048* (2013.01)
*G06F 3/0484* (2013.01)

(52) U.S. Cl.
CPC .................................. *G06F 3/0484* (2013.01)

(58) Field of Classification Search
CPC .......................... G06F 3/0484; H04L 41/0856
See application file for complete search history.

(56) References Cited

U.S. PATENT DOCUMENTS

| 6,285,369 | B1 | 9/2001 | Kross et al. |
| 6,604,068 | B1 | 8/2003 | Bukowski et al. |
| 8,516,384 | B1 | 8/2013 | Torgerson |
| 2001/0028368 | A1 | 10/2001 | Swartz et al. |
| 2004/0221296 | A1 | 11/2004 | Ogielski et al. |
| 2005/0086268 | A1 | 4/2005 | Rogers |
| 2006/0265664 | A1 | 11/2006 | Simons et al. |

OTHER PUBLICATIONS

GIMP 2.6 (available via Internet Archive Wayback Machine; Aug. 11, 2005; http://docs.gimp.org/en/gimp-undo-dialog.html).

*Primary Examiner* — Omar Abdul-Ali
(74) *Attorney, Agent, or Firm* — Harrity & Harrity, LLP

(57) ABSTRACT

One aspect relates to saving and retrieving view-specific information that facilitates views to be saved and retrieved within an interface of a computer system. View-relevant information associated with a visual context of the computer system is saved in memory or other medium, allowing the information to be retrieved in an easy manner. In one embodiment, a computer system displays a thumbnail representation of a specific graphical view, and permits the user to select the representation, causing the system to navigate to the specific graphical view. In this way, the visual context of the computer system can be restored.

20 Claims, 19 Drawing Sheets

METHOD AND APPARATUS FOR PERFORMING VIEWMARKING

RELATED APPLICATIONS

This application is a continuation of U.S. patent application Ser. No. 11/873,166, filed Oct. 16, 2007 (now U.S. Pat. No. 8,516,384), which claims priority under 35 U.S.C. 119(e) to U.S. Provisional Application No. 60/852,603, filed Oct. 17, 2006, The disclosures of these applications are incorporated herein by reference.

BACKGROUND

There exist many applications that save references, commonly referred to as "bookmarks" to content, such as files, documents, video, and web pages, among others. Such bookmarks are generally text-based references to the content, such as a title or filename of a document or other content, that when selected by a user, permits the application to load or otherwise access the selected document or other content. Such bookmarks may exist, for example, in commonly-known applications such as the Microsoft Internet Explorer web browser application, which allows "favorite" bookmarks to Uniform Resource Locators (URLs) to be stored by a user and retrieved at a later time. Such URLs are addresses that identify a location of a Web page or other content. Further, other applications may use a similar bookmarking feature that saves references to various contents. For instance, word processing packages such as the well-known Microsoft Word word processing package may allow users to open documents recently opened by selecting a name of a previously-accessed file within a dialog box displayed in a window displayed by the application, or by accessing the previously-accessed file from a file menu.

Graphical modeling languages may be used to graphically describe and program a system. Such languages are various, and may include, for example, graphical modeling environments such as those provided by the Simulink® software product. In particular, the Simulink product may assist in simplifying the process of designing, simulating, and implementing dynamic systems. Tools provided in such software environments generally permit a user to create a graphical representation of a system, such as statistical diagrams, timing diagrams, and other similar graphical elements that can be used to describe system behavior.

SUMMARY

It is appreciated that in certain systems, there is a need for having a tool to navigate large and complex diagrams. For instance, it is appreciated that using the Simulink software product, there is a trend for users to build larger and larger systems. Such systems generally involve multiple layers of a hierarchy, usually involving many different hierarchical elements within a single system. Also, it is appreciated that there may be multiple interface types associated with a described system, such as timing diagrams, state charts and other interface types, and many of these different interfaces may be used in concert to describe a modeled system. In summary, the number of diagrammatic layers/views which the average user must manage is ever-increasing.

One aspect relates to a tool that permits a user to more easily navigate complex diagrams or other similar interfaces. As presented herein, a method is provided for storing a view or portion thereof which identifies a user view of a particular diagram. A representation of this view may be stored in a computer system and presented to, e.g., a user via an interface of the computer system at a later time. The user may then navigate to the previously-stored view in an easy manner. Conventional systems such as word processing systems and Web browsers store references to documents and files, but they do not represent and store a view of a system.

Further, in contrast to textual-based bookmarks, a view may be represented by graphical indications (referred to herein as a "viewmark") that are indicative of the particular view. For instance, a thumbnail image of the particular view may be used as a representation that is presented to a user in the interface of the computer system. The user may then select the graphical indication, and the view used to generate the representation may be retrieved and displayed to the user. Because a graphical representation may be used and displayed to the user, the user may be more apt to identify the view which is to be located. More specifically, the user may more readily identify a particular view based on its graphical representation.

According to another aspect, a system may be used to graphically show a representation of a specific graphical view and maintain (e.g., archive or otherwise persist to a storage entity) view-relevant information in a repository. This view-relevant information may contain information that describes, according to one embodiment, a location within a model hierarchy of a graphical programming language. Further, in addition to the location information, the system may store other view-specific information such as one or more visual settings associated with the view (e.g., scroll settings, zoom factor, etc.), an interface context that was executing on the computer system when the view was saved (e.g., applications, tools that were activated at the time, parameters loaded in memory at the time of the view was saved, etc.) among other settings and environmental conditions of the computer system at the time the view-specific information was stored.

In the context of a graphical programming language, information regarding the models being viewed may be stored or otherwise associated with the view-specific information. According to one embodiment, the view-specific information may include a state of a model at the time the viewmark was created. According to one embodiment, a state of a model may be viewed without the model to which the viewmark relates being loaded into memory. Thus, in one embodiment, the viewmark state may be independent of the state of the actual model, and the viewmark may serve as a snapshot of the loaded model state. In another embodiment, the viewmark may be updated in real-time, and thus may serve as a monitor of the model state as more fully discussed below.

Although some aspects relate to graphical programming languages and some of the aspects are described with respect to graphical programming languages, it should be appreciated that the capability of navigating views and saving view-specific information may be performed in other applications and interfaces to permit a user to retrieve a saved view-specific context.

According to one aspect, the view information may be saved in response to an action taken by a user. For instance, the user may select a view saving tool from a menu, an icon, hotkey or other type of input, and in response to the action taken by the user, the view information may be saved. In one embodiment, the user may be able to select a view of the interface that is saved with the view-specific information, such as, for example, a graphical representation such as a thumbnail image that is used to graphically represent the view. According to one embodiment, this graphical representation may be displayed in a window of the user's computer, where the user can access the representation to retrieve the view-specific information. The user may be able to create the graphical representation by selecting a region of the interface that should be used as the graphical representation.

In another embodiment, the graphical representation may be placed in a location convenient for the user, such as in a document, on a desktop, in a view of another application, or other location that permits the user to navigate to the view. In the context of a graphical programming environment, the user may be provided the capability of placing the graphical representation within a diagram (e.g., a timing diagram), and selection of the graphical representation by the user may permit the user to navigate to another view. In the case of complex diagrams, this may allow the user to more easily navigate between views, and program more efficiently as a result.

In another example, the graphical representation may be updated in real-time, such that if changes are made to the referenced view, the representation may be updated as a result. For instance, in the case where the graphical representation depicts a view of a diagram, if the diagram is updated, the graphical representation may be changed in response. This capability may be useful, for instance, in a debugging mode where it would be beneficial to see more than one view at the same time, so that behavior of a system during different conditions may be observed. Smaller views of a larger system may be captured and arranged in the interface to permit a user/programmer to see various aspects of a system in a single interface at the same time.

According to one aspect, a computer-readable medium is provided, the computer-readable medium comprising computer-executable instructions, when stored into a memory of a computer system and executed by the computer system, performs a method comprising storing view-specific information in a storage entity, the view-specific information identifying at least one view of a plurality of views presented within an interface of a computer system, displaying a graphical representation of the view-specific information, and in response to an action relating to the graphical representation, retrieving the stored view-specific information from the storage entity into the memory of the computer system and displaying the at least one view within the interface of the computer system. According to one embodiment, the computer system displays a graphical model representing a modeled system, the graphical model comprising a plurality of elements, and wherein storing the view-specific information identifying the at least one view further comprises storing view-specific information relating to a view of the modeled system. According to another embodiment, the computer-readable medium further comprises storing a state of the modeled system.

According to another embodiment, the computer-readable medium further comprises storing a portion of the at least one view, the portion being defined using an input device of the computer system. According to another embodiment, the view-specific information comprises one or more visual settings associated with the at least one view. According to another embodiment, the view-specific information comprises a set of computer settings defining an interface context executing on the computer system. According to another embodiment, the view-specific information comprises a set of computer settings defined when the view-specific information was stored.

According to another embodiment, the computer-readable medium further comprises updating the graphical representation in response to a change in the at least one view. According to another embodiment, the computer-readable medium further comprises storing view-specific information at a predetermined time. According to another embodiment, the computer-readable medium further comprises arranging view-specific information in an order based at least in part at a time the view-specific information was created. According to another embodiment, the computer-readable medium further comprises permitting an arrangement of at least two of the plurality of views to be displayed on the interface of the computer system.

According to another embodiment, the computer-readable medium further comprises displaying another graphical representation representing the at least two of the plurality of views. According to another embodiment, the computer-readable medium further comprises, in response to a selection of the another graphical representation, displaying the at least two of the plurality of views.

According to another embodiment, the computer-readable medium further comprises associating the graphical representation of the view-specific information with a diagram associated with a graphical programming language. According to another embodiment, the computer-readable medium further comprises navigating, in response to a selection of the graphical representation, to the view identified by the view-specific information. According to another embodiment, the stored state of the modeled system is independent of a current state of the modeled system. According to another embodiment, the action relating to the graphical representation further comprises an action taken by a user in relation to the graphical representation, the action comprising at least one selecting the graphical representation within the interface of the computer system, dragging and dropping the graphical representation within the interface of the computer system, or selecting a control that navigates to the at least one view.

According to another embodiment, storing further comprises archiving the view-specific information to the storage entity. According to another embodiment, the storage entity comprises at least one of a file system, a database, and a network-based storage system. According to another embodiment, the method further comprises serializing the view-specific information to the storage entity.

According to one aspect, a computer-readable medium is provided, the computer-readable medium comprising computer-executable instructions, for performing a method comprising storing view-specific information, the view-specific information identifying a view presented within an interface of the computer system, the view identifying at least a portion of the interface of the computer system, the at least one portion being selected by a user for display in the computer system, and displaying a graphical representation of the view. According to one embodiment, the computer-readable medium further comprises updating and displaying the graphical representation in response to a change in the view. According to one embodiment, the computer system provides a graphical model representing a modeled system, the graphical model comprising a plurality of elements, and wherein storing the view-specific information identifying the view comprises storing view-specific information relating to a view of the modeled system.

According to another embodiment, the computer-readable medium further comprises permitting an arrangement of a plurality of views to be displayed on the interface of the computer system. According to another embodiment, each of the plurality of views include at least a portion of a view of a graphical model representing a modeled system.

According to one aspect, a computer-readable medium is provided, the computer-readable medium comprising computer-executable instructions for performing a method comprising, in response to a first user action, storing view-specific information in a storage entity, the view-specific information identifying at least one view of a plurality of views presented within an interface of a computer system, displaying a graphical representation of the view-specific information, and retrieving the stored view-specific information from the storage entity into the memory of the computer system and displaying the at least one view within the interface of the computer system. According to one embodiment, the first user action is an explicit user action. According to one embodiment, retrieving the stored view-specific information is performed responsive to a second user action.

According to another embodiment, the second user action is performed in relation to the graphical representation, the second action comprising at least one selecting the graphical representation within the interface of the computer system, dragging and dropping the graphical representation within the interface of the computer system, or selecting a control that navigates to the at least one view. According to another embodiment, the computer system displays a graphical model representing a modeled system, the graphical model comprising a plurality of elements, and wherein storing the view-specific information identifying the at least one view further comprises storing view-specific information relating to a view of the modeled system. According to another embodiment, the computer-readable medium further comprises storing a state of the modeled system. According to another embodiment, the computer-readable medium further comprises storing a portion of the at least one view, the portion being defined by a user with the interface of the computer system.

According to another aspect, a computer-implemented method is provided comprising storing view-specific information in a storage entity, the view-specific information identifying at least one view of a plurality of views presented within an interface of a computer system, displaying a graphical representation of the view-specific information, and in response to an action relating to the graphical representation, retrieving the stored view-specific information from the storage entity into the memory of the computer system and displaying the at least one view within the interface of the computer system.

According to another aspect, a computer-implemented method is provided comprising storing a view-specific information, the view-specific information identifying a view presented within an interface of the computer system, the view identifying at least a portion of the interface of the computer system, the at least one portion being selected by a user for display in the computer system, presenting, to a user of the computer system, a graphical representation of the view, and updating and displaying the graphical representation in response to a change in the view.

According to another aspect, a computer-implemented method is provided comprising in response to a first user action, storing view-specific information in a storage entity, the view-specific information identifying at least one view of a plurality of views presented within an interface of a computer system, presenting, to a user of the computer system, a graphical representation of the view-specific information, and retrieving the stored view-specific information from the storage entity into the memory of the computer system and displaying the at least one view within the interface of the computer system.

According to another aspect, a computer system is provided comprising a memory, an interface adapted to display to a user at least one view presented within an interface of the computer system, a processor adapted to identify view-specific information, the view-specific information identifying the at least one view, and to associate a graphical representation with the identified view-specific information, and a storage element that is adapted to store the view-specific information, wherein the processor is responsive to an action relating to the graphical representation, and wherein the processor is adapted to retrieve the stored view-specific information from the storage element into the memory of the computer system, and wherein the interface is adapted to display the at least one view within the interface of the computer system. According to one embodiment, the interface is adapted to present, to the user, the graphical representation of the view-specific information. According to another embodiment, the computer system further comprises means for processing a graphical model representing a modeled system, the graphical model comprising a plurality of elements, and wherein the storage element is adapted to store view-specific information relating to a view of the modeled system.

According to another embodiment, the view-specific information comprises one or more visual settings associated with the view. According to another embodiment, the view-specific information comprises a set of computer settings defining an interface context executing on the computer system. According to another embodiment, the system further comprises means for associating the graphical representation of the view-specific information with a diagram associated with a graphical programming language. According to another embodiment, the system further comprises means for navigating, upon selection by the user of the graphical representation, to the view identified by the view-specific information.

According to another aspect, a system is provided comprising means for storing view-specific information in a storage entity, the view-specific information identifying at least one view of a plurality of views presented within an interface of a computer system, means for presenting, to a user of the computer system, a graphical representation of the view-specific information, and means responsive to an action relating to the graphical representation, for retrieving the stored view-specific information from the storage entity into the memory of the computer system and displaying the at least one view within the interface of the computer system.

According to another aspect, a system is provided comprising means for storing a view-specific information, the view-specific information identifying a view presented within an interface of the computer system, the view identifying at least a portion of the interface of the computer system, the at least one portion being selected by a user for display in the computer system, means for presenting, to a user of the computer system, a graphical representation of the view, and means for updating and displaying the graphical representation in response to a change in the view.

According to another aspect, a system is provided comprising means for storing, responsive to a first user action, view-specific information in a storage entity, the view-specific information identifying at least one view of a plurality of views presented within an interface of a computer system, means for presenting, to a user of the computer system, a graphical representation of the view-specific information, and means for retrieving the stored view-specific information from the storage entity into the memory of the computer system and displaying the at least one view within the interface of the computer system.

According to another aspect, a computer-readable medium is provided, the computer-readable medium comprising computer-executable instructions, the instructions including instructions for storing view-specific information in a storage entity, the view-specific information identifying at least one view of a plurality of views presented within an interface of a computer system, instructions for presenting, to a user of the computer system, a graphical representation of the view-specific information, and instructions for retrieving, responsive to an action relating to the graphical representation, the stored view-specific information from the storage entity into the memory of the computer system and displaying the at least one view within the interface of the computer system.

According to another aspect, a computer-readable medium is provided, the computer-readable medium comprising computer-executable instructions, the instructions including instructions for storing a view-specific information, the view-specific information identifying a view presented within an interface of the computer system, the view identifying at least a portion of the interface of the computer system, the at least one portion being selected by a user for display in the computer system, instructions for presenting, to a user of the computer system, a graphical representation of the view, and instructions for updating and displaying the graphical representation in response to a change in the view.

According to another aspect, a computer-readable medium is provided, the computer-readable medium comprising computer-executable instructions, the instructions including instructions for storing, responsive to a first user action, view-specific information in a storage entity, the view-specific information identifying at least one view of a plurality of views presented within an interface of a computer system, instructions for presenting, to a user of the computer system, a graphical representation of the view-specific information, and instructions for retrieving the stored view-specific information from the storage entity into the memory of the computer system and displaying the at least one view within the interface of the computer system.

Further features and advantages as well as the structure and operation of various embodiments are described in detail below with reference to the accompanying drawings. In the drawings, like reference numerals indicate like or functionally similar elements.

BRIEF DESCRIPTION OF THE DRAWINGS

The accompanying drawings are not intended to be drawn to scale. In the drawings, each identical or nearly identical component that is shown in various figures is represented by a like numeral. For the purpose of clarity, not every component may be labeled in every drawing. In the drawings.

DETAILED DESCRIPTION

As discussed above, one aspect relates to saving and retrieving view-specific information that facilitates views to be saved and retrieved within an interface of, for example, a computer system. In contrast to traditional bookmarking methods which simply keep a list of favorite elements, according to one embodiment, view-relevant information associated with a visual context of the computer system may be saved in memory or other medium, allowing the information to be retrieved in an easy manner. In one embodiment, a computer system displays a thumbnail representation of a specific graphical view, and permits the user to select the representation, causing the system to navigate to the specific graphical view. In this way, the visual context of the computer system can be restored.

Figure 1:
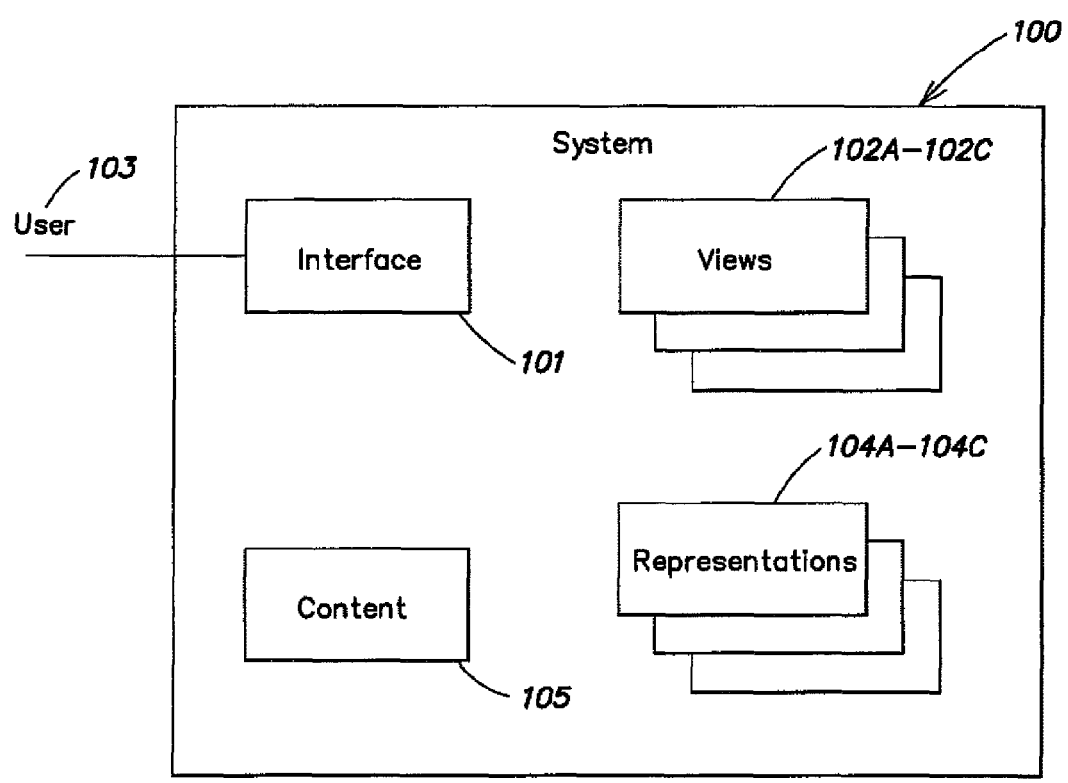
FIG. 1 shows a system that may be used to perform viewmarking according to one embodiment.

According to one embodiment, a computer system may be provided which is capable of storing view-specific information as shown with particularity in FIG. 1. In particular, system 100 includes an interface 101 which is capable of showing one or more views 102A-102C to a user 103. These views may include, for instance, one or more screen views, windows, or any other combination of display features. In one embodiment, a particular view 102A comprises at least a portion of an interface that displays information to the user.

In one example, the interface 101 may display information related to a graphical programming language. For instance, the interface may display one or more elements of a timing diagram or other diagram type that relates to a modeled system. Further, the interface may include multiple components (e.g., windows) that display various aspects of a system being modeled. In general, views 102A-102C may be any type of view relating to displays shown by interface 101, such as a display of stored content 105, display of a computer process, input, or output, or any other information that can be displayed by computer 100.

According to one embodiment, system 100 may be capable of creating and storing one or more representations 104A-104C which are used to represent respective views 102A-102C. For instance, system 100 may store such representations in a memory or other storage entity within the computer system or any other storage entity located in a communication network. Such representations 104A-104C may be used to retrieve their respective views 102A-102C.

Figure 2A:
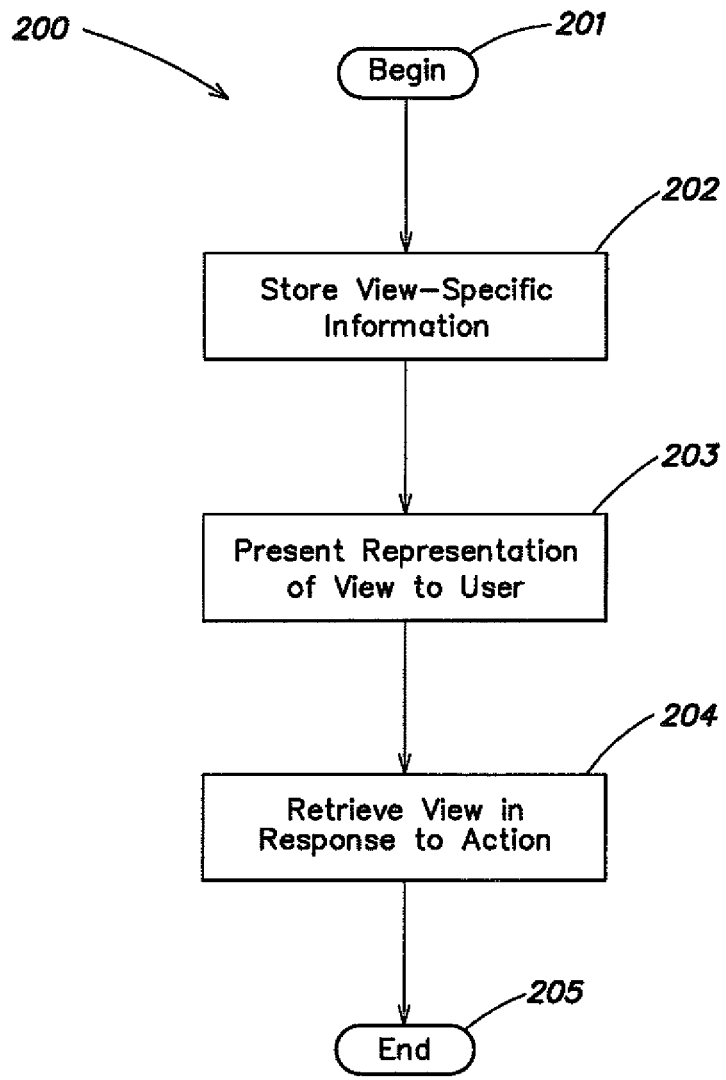
FIG. 2A shows an example process for performing viewmarking according to one embodiment.

FIG. 2A shows an example sequence 200 that may be used to perform viewmarking according to one embodiment. Such a sequence may be performed, for instance, using computer system 100. At block 201, sequence 200 begins. According to one embodiment, at block 202, the computer system (e.g., computer system 100 as discussed above with reference to FIG. 1) stores view-specific information in a memory of the computer system (e.g., a storage entity). As discussed above, this view-specific information may, according to one embodiment, identify a particular view that is displayed, e.g., to a user at some point during operation of the computer system.

At block 203, the computer system may present a representation of the view to the user in a display of the computer system. As discussed above, a graphical representation may be identified that permits the user to more readily identify the view to which the view-specific information relates. In one example, the graphical representation may include an image that is used to graphically represent the view. At block 204, the computer system may retrieve the view in response to an action performed on the computer system. For instance, a computer system may be responsive to a user command, menu selection, selection of the graphical representation, or other action, and the view may be displayed to the user. At block 205, process 200 ends.

Figure 2B:
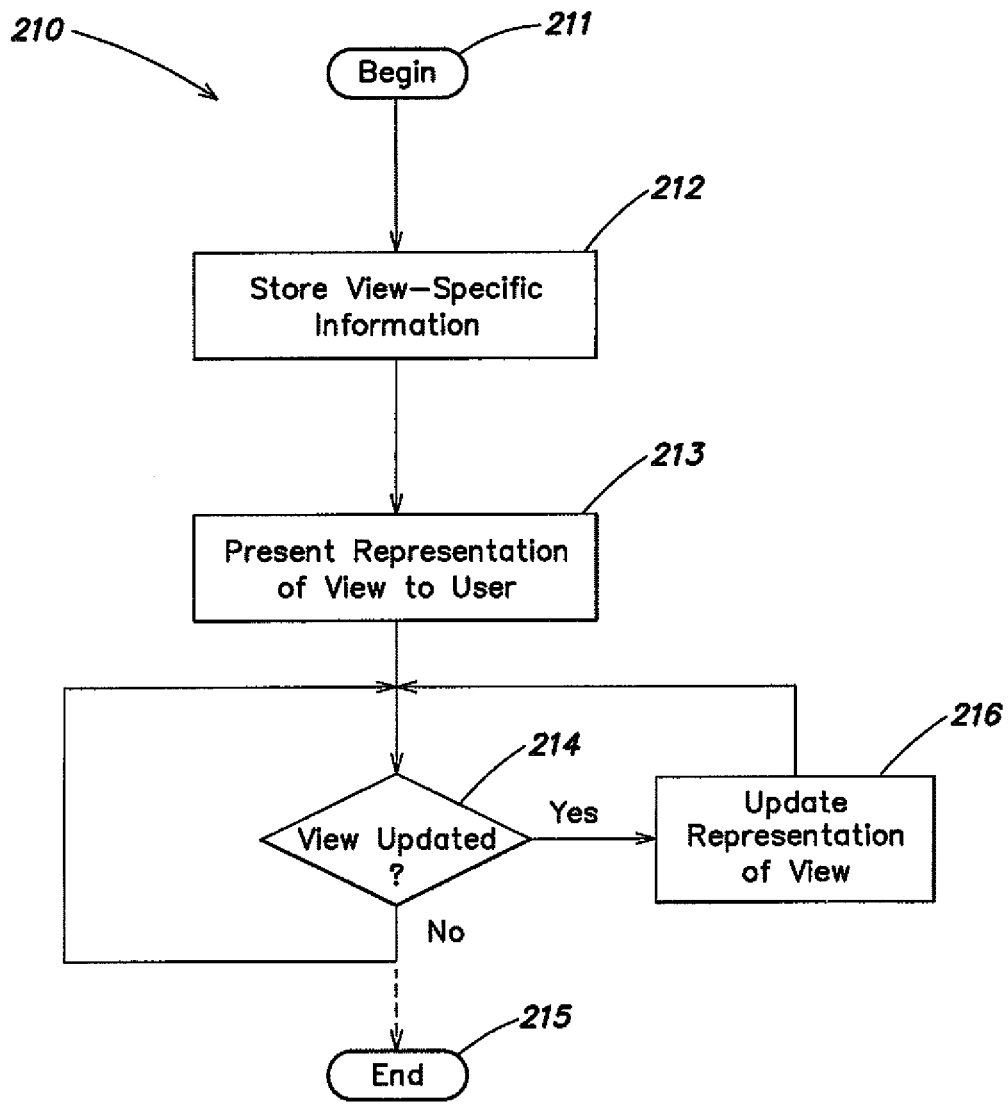
FIG. 2B shows another example process for performing viewmarking according to one embodiment.

FIG. 2B shows another example sequence 210 that may be used to perform viewmarking according to one embodiment. At block 211, sequence 210 begins. At block 212, the computer stores view-specific information similar to block 202 as discussed above. Similarly to block 203, at block 213, the computer presents a representation of a particular view to the user. At block 214, it is determined whether the view to which the representation relates is updated. If so, the representation of the view is updated at block 216 and displayed to the user. If not, any changes to the view may continue to be observed and any updates are applied to the representation of the view and displayed, for example, to the user. Sequence 210 could continue indefinitely, as the representations may serve as a monitor of their associated views, as updates to the views can be seen in their associated representation. Sequence 210 may be halted by the user, and may end at block 215.

Figure 3:
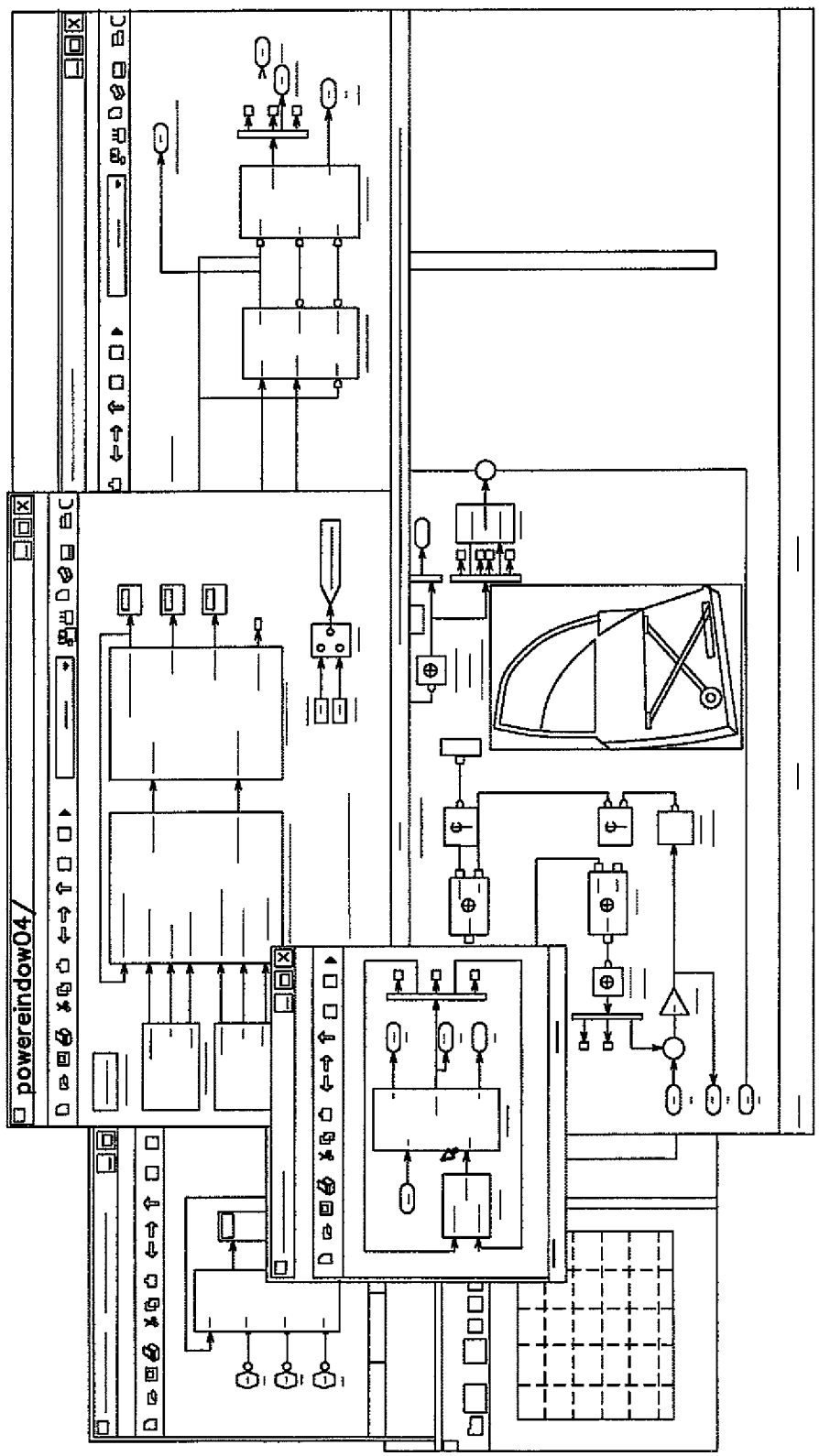
FIG. 3 shows an example graphical programming environment in which various aspects may be practiced.

Below are several examples of situations where viewmarking functions according to various aspects may be used. FIG. 3 shows an example of a large model in a graphical programming environment, wherein the model contains many layers, and involves a number of different domains (e.g., a state diagram, charts, drawings, etc.). Such a large model may be suitable for improved navigation functions, as it may be difficult to locate different entities within the modeled system.

Often while working on such a large system, certain subsystem views may be critical and may need to be observed. According to one aspect, a capability of identifying and storing views of the model may be provided which allows a user to more effectively manage the complexity of the environment and its associated models. For instance, a user could indicate that he/she would like to save a certain graphical view.

Figure 4:
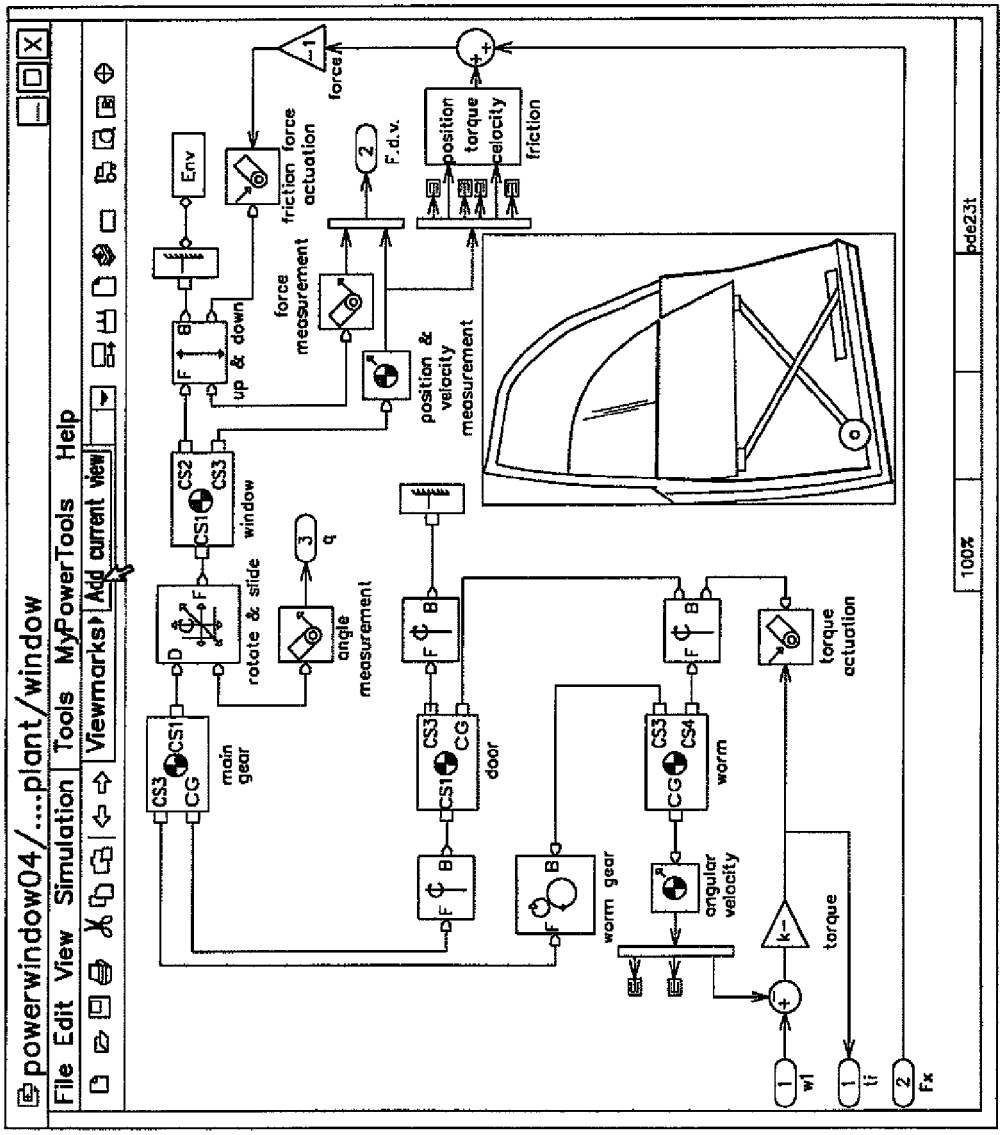
FIG. 4 shows an example diagram of which a viewmark according to one embodiment may be created.

One mechanism for saving a view may include providing a control within the graphical programming environment that permits, e.g., the user to save a particular view. For instance, an application program in a graphical programming environment may have a dropdown menu, toolbar button, keystroke, or other control, that when selected by the user, permits a view to be saved. For example, the view may include one or more windows, or portions thereof. FIG. 4 shows one example method using a dropdown menu that permits a user to add the current view as a viewmark. In particular, FIG. 4 shows a portion of a model that may be used to create an associated viewmark. Additionally, the user may be provided a control (e.g., a selection box) that permits the user to select a portion of the diagram to be represented by the viewmark. It should be appreciated that any method involving user interaction can be used to trigger a creation of a viewmark. Further, the user may create a viewmark using a current view, or a portion thereof. Alternatively, a viewmark may be created automatically, as discussed further below.

Figure 5:
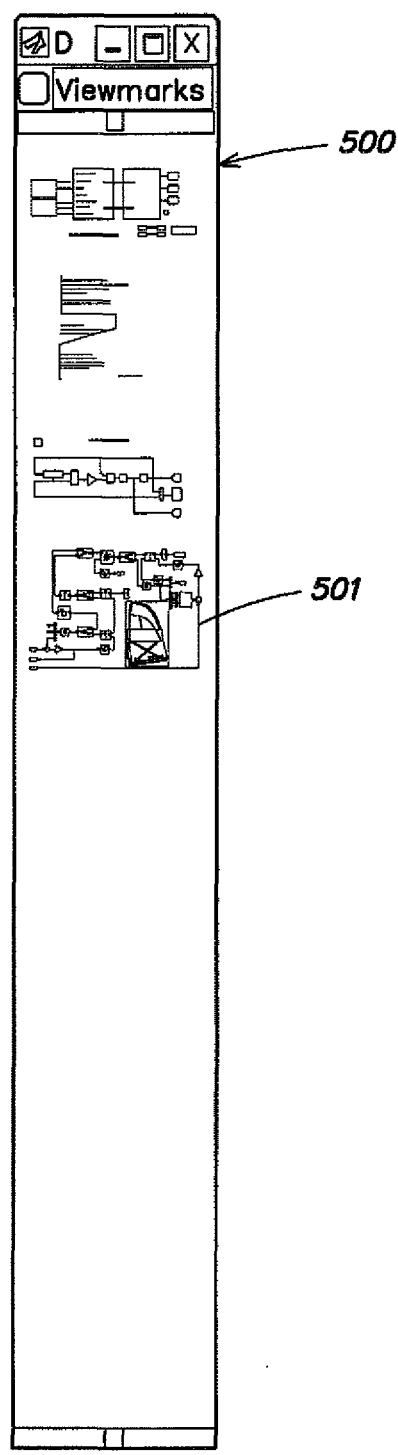
FIG. 5 shows an example interface that may be used to display viewmarks according to one embodiment.

For instance, as shown in FIG. 4, the selection of the dropdown menu option could result in adding a viewmark 501 associated with the current view to a list of viewmarks 500 as shown in FIG. 5. This list of viewmarks may be displayed to the user in the display of a computer system (e.g., system 100). Such a list may also be displayed in an area where the user can easily select viewmarks from the list. In response to selection by the user, the view associated with the particular viewmark may be retrieved and displayed to the user. The system may also permit a user to create a viewmark by selecting a portion of a view using, for example, a cursor, box, or other technique. The selected area and its associated element, graphics, and/or other features may be used to represent the particular view as a viewmark.

According to one embodiment, a viewmark viewer that displays a list of viewmarks may allow a user to quickly navigate to a viewmarked view. Although viewmarks can be displayed in a list, it should be appreciated that viewmarks can be displayed in other ways using other methods. For example, viewmarks may be displayed in a tree structure having a pull down menu that contains created viewmarks. Also, viewmarks may be arranged visually in a "cover view" similar to display of music covers in a jukebox. Other methods for displaying viewmarks may be used.

According to one embodiment, the views associated with items listed in the viewmark viewer need not be loaded in memory. Rather, according to one embodiment, selection of the particular viewmark may cause view-specific information to be retrieved, and the associated view shown to the user in the display.

According to one aspect, the graphical representation of the view may derive at least some of its graphical properties from the associated view. For instance, the representation may include a thumbnail image of the view being represented, and the image may be beneficial in allowing the user to easily associate the viewmark with the represented view. Such a graphical representation is distinct to common textual representations often found in bookmarking schemes for Web browsers and other tools. Further, it is appreciated that having a detailed thumbnail representation of views is beneficial to people working in graphical programming languages such as the well-known Simulink product, the Stateflow product, the SimMechanics product, and other similar graphical computing systems.

Figure 6:
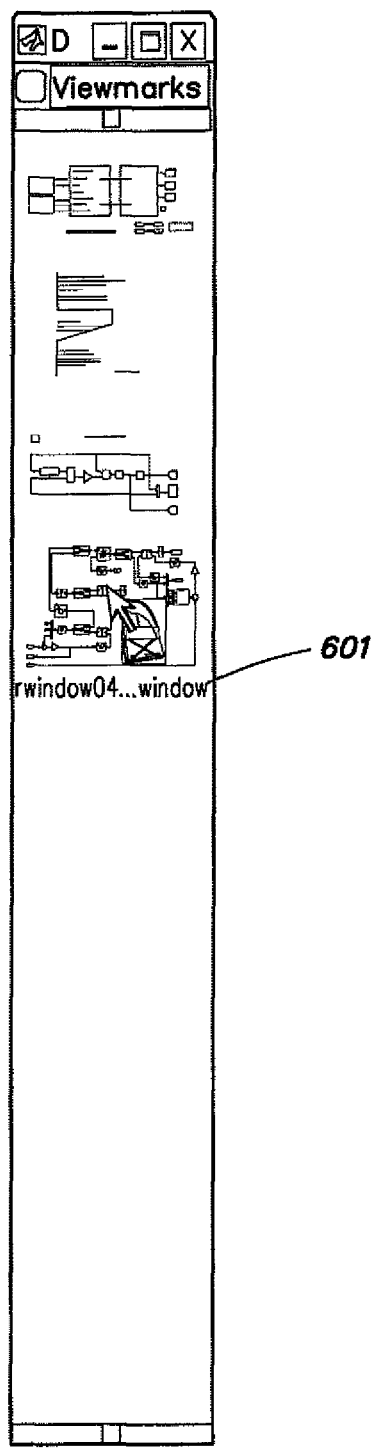
FIG. 6 shows another example interface that may be used to display viewmarks according to one embodiment.

According to another embodiment shown by way of example in FIG. 6, textual descriptions of the view may be combined with the graphical representation for display to the user. For instance, as shown in FIG. 6, when, for example, a cursor associated with a pointing device (e.g., a mouse) is hovered over a particular viewmark, a textual representation 601 of the view may be shown in the display. This textual representation may assist in locating the correct view which could be subsequently retrieved. In addition, the system may display other information associated with the viewmark that may allow a user to more easily identify the view. In one example, if a cursor is placed over a viewmark with a pointing device, a pop up window, or other display mechanism, may be shown in the display which provides the user with information about the viewmark. In another example implementation, the user may be permitted to configure the textual representation associated with one or more viewmarks.

Figure 7:
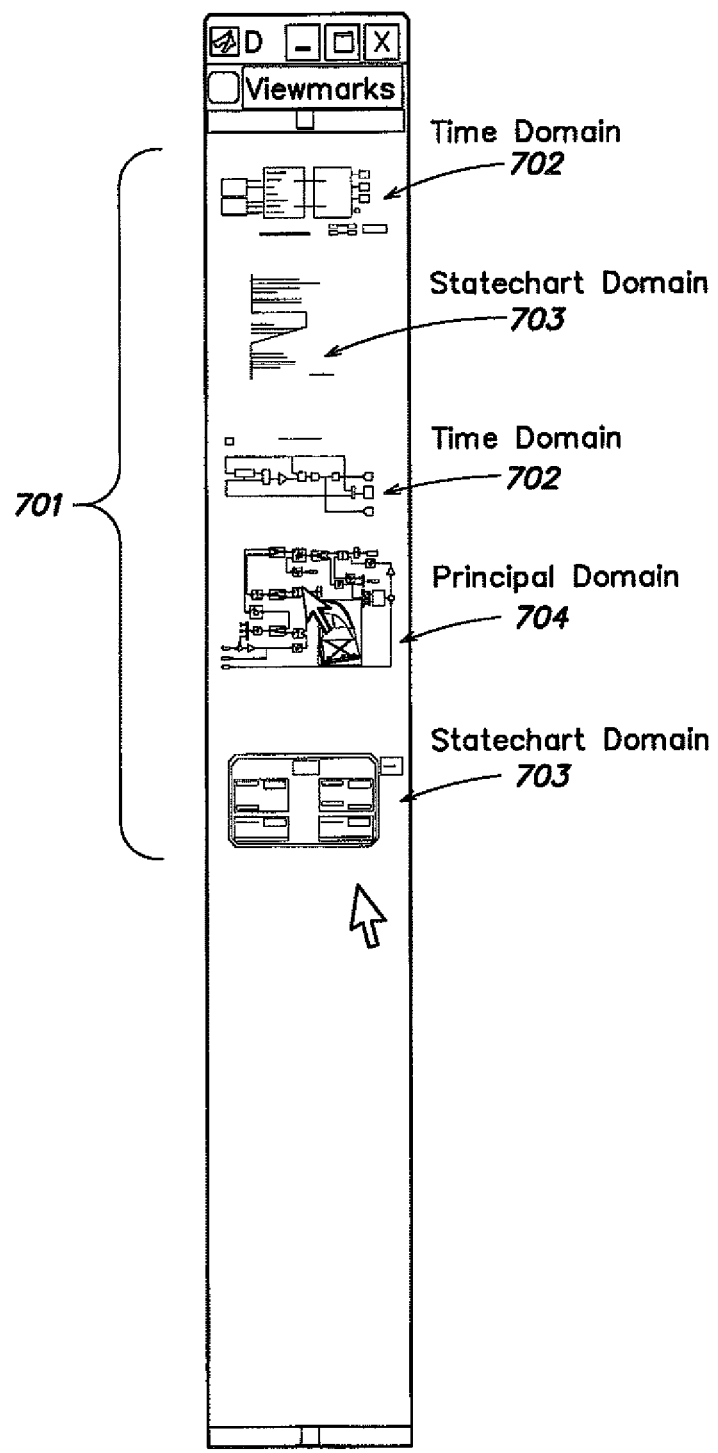
FIG. 7 shows another example interface that may be used to display viewmarks according to one embodiment wherein viewmarks span more than one domain.

Further, it should be appreciated that in a graphical programming environment involving views in different domains, such a viewmarking capability may be helpful. For instance, as shown by way of example in FIG. 7, viewmarks 701 that relate to elements in more than one domain may be created which permit the user to transition between various domains. For instance, as shown in FIG. 7, a graphical view of elements from a time-domain 702 (e.g., from the Simulink program interface), a physical domain 704 (e.g., from the well-known SimMechanics program interface), and/or a statechart domain 703 (e.g., from the well-known Stateflow program interface) may be created and subsequently used by the user. By permitting the user to navigate quickly between domains, more efficient programming and editing may be performed in the graphical programming environment.

View-specific information may be stored that contains information about the location of the view. The view-specific information may be stored (e.g., archived) in a repository. The stored view-specific information may include, for instance, information identifying a particular location, address, location of a layer in a model hierarchy, or other location information. Further, the view-specific information may include information relating to the view such as, for example:
- xy-scroll offsets
- zoomfactor
- tools or other application programs that may have been activated at the time parameters associated with the applications The graphical representation of the view may include, for example, a thumbnail image that can include text only, images only, symbols, a combination of text and images, or any other information relating to the view. The graphical representation may also include information that reflects a state of the view (e.g., a color, an opaqueness, highlight, etc.). For instance, if the view has been recently updated, a visual indication (e.g., a highlight of the graphical representation) can be displayed to the user. In another example, the user may be allowed to perform operations on the view via the graphical representation. For instance, the user may be permitted to zoom in and zoom out of the view by selecting a control associated with the graphical representation.

Additional features may be provided that are helpful in a model-related graphical programming environment. For example, a user may use viewmarks that can be associated with model component views, debugger views, editor views, among others. These viewmarks may permit the user to navigate more quickly between such views. Further, the graphical programming environment may include viewmarks that have links to other information (e.g., web sites, other graphical models, other portions of an open graphical model, other views of another model or a currently open model) to permit the user to more effectively program in the environment. In another example, the environment may implement an object pallet with viewmarks to allow the user to drag and drop model components, viewmarks, and/or other items from the pallet into a model or other region of a display device.

In another example implementation, the environment may allow viewmarks to be used to capture snapshots of model views and/or other information related to a model (e.g., code, debugging information, etc.). Because, according to one embodiment, it is appreciated that by creating a viewmark, a state of a model may be stored at the time the viewmark is created. In another implementation, the environment may provide viewmarks that may allow a user to go back to a determined context that is associated with a model. This may be accomplished, for example, by restoring state information associated with a model of interest, where the stored state information was stored when the viewmark was created.

Further, the graphical programming environment may allow viewmarks to be incorporated into other functionality related to models, such as configuration management functions, code generation functions, etc. In this way, the use of viewmarks may be extended to other functions, application or systems.

Other helpful features may be provided using viewmarks according to various embodiments. For instance, a capability may be provided that allows the use of a viewmark toggle button that enables, e.g., a user to quickly open model views, or other views, so that the user can scroll through the views. In another example implementation, a capability may be provided that allows for viewmarks to be arranged, sorted, etc., according to user determined or system determined preferences and/or parameters. For example, viewmarks associated with a view that is currently opened on a computer may be propagated to the top of a viewmark queue or list. In another example, a system may allow for cascaded views to be used with viewmarks.

According to another embodiment, viewmarks may be used between multiple users to coordinate activities. For instance, a capability may be provided that allows a first user to label a viewmark on behalf of a second user. For example, a developer can generate viewmarks for a model and can label the viewmarks with descriptive text, where the descriptive text is presented to the second user via a pop up window or other display mechanism. Also, views as experienced by a first user can be recorded as viewmarks, thus documenting a view progression that can be replicated by a second user. For instance, such a capability may be beneficial in a training environment or testing environment, where repetitive recall of previous views is helpful.

In another example implementation, it may be beneficial to permit a system to automatically create viewmarks. For example, an application may allow auto-collection modes to be used with viewmarks to acquire information on behalf of viewmarks or for use with viewmarks. For instance, an audit function or management function may periodically create viewmarks, even without knowledge of the user. In another example, a user or the system may determine when and under what conditions a viewmark is made (e.g., user A just modified code or other content of element B, so a viewmark of element B is created). Further, in one implementation, the system may allow viewmark labels to be specified by a user or by a device, e.g., a computer executing a model. For instance, in a graphical programming environment, a particular viewmark may be updated to reflect a version number associated with a view of a particular model. This versioning capability may assist the programmer as an additional tool used for the creation of graphical programs.

Further, viewmarks may be created based on timing relations. For instance, a system may permit a timer, or another technique, to be used to capture viewmarks at determined intervals or based on determined actions (e.g., user activities). Further, viewmarks may be arranged based on time information. For instance, viewmarks may be arranged in a timeline to allow a user to go back to a determined state/context that may have occurred at a previous time interval. Here, the system may allow contexts to be reconstituted (e.g., current contexts, past contexts, etc.). In a programming environment, this may allow recovery of earlier views when changes have been made to a model and/or model components (e.g., blocks, connections, etc.). As discussed, models and model component states may be reconstituted based on saved state information.

In another embodiment, viewmarks can also be dragged and dropped within a display of a computer system for the purposes of, for example, reordering/organization and navigation. For instance, a user may have displayed an editor program interface on a display of a computer system, and the user may wish to navigate the editor program interface to a particular view. In such a case, the user may drag a viewmark and drop the viewmark onto the editor window. Such an action is different than clicking on the viewmark, which may bring up a new editor or retarget the active editor to the view represented by the viewmark. In addition, if a viewmark is dragged and dropped outside of an editor, a new editor window may be opened at a drop location, the new editor window presenting the view.

Also, as discussed above, two viewmarks can be combined (e.g., using drag-and-drop techniques) to make a set of views. Such a feature might be useful, for example, to make more complex viewmarks representing multiple views. Such a viewmark is referred to herein as a compound or complex viewmark. For instance, in a graphical programming environment, a number of different "views" of a particular model may need to be observed and edited during programming and debugging of a particular subsystem. In particular, it may be convenient for a programmer using a graphical programming interface to allow the user to show and/or store multiple views (e.g., views showing the states of one or more models) in a single compound view.

In one example, it is appreciated that it would be convenient for a programmer to bring up, e.g., in the display of his/her computer system, a set of models that would more easily allow the programmer to perform the task at hand. Such sets of viewmarks may be stored, retrieved by the same user, or shared with other users. By saving and sharing sets of viewmarks among users, programming tasks may become even more efficient.

Consider the following example that illustrates yet another aspect relating to compound viewmarks. For instance, a collection of viewmarks V1, V2, and V3 may be defined, with each viewmark being associated with a single view (e.g., a single window with a particular zoom or pan setting, etc.). In this example, views V1, V2, and V3 may each correspond to some view of a single layer in a system. Such views may also have their own associated view-specific properties (e.g., one view may have a particular zoom and pan offset, etc.).

Consider now that, according to one embodiment, a user may be provided the ability to add a fourth viewmark (V4) to the collection that is the combination of what views V1 and V3 represent. Now viewmark V4 no longer relates to a single view of the system, but instead to a reference to two previously-defined views. According to one embodiment, after the defined viewmark V4 is selected, the same result may occur as if the V1 and V3 viewmarks were selected individually. Further, a compound viewmark can store how and at what time the views were selected and/or displayed, relative placement information identifying how the views are displayed, among other information that relates the viewmarks. For instance, how the views are displayed in the interface (e.g., one view located on top of the other) may be stored as information with the compound viewmark. Also, the order which the views were displayed may also be stored as information with a compound viewmark (e.g., as in a training exercise showing a sequence of views through which the programmer may progress), and the views associated with the compound viewmark may be recalled in the same order.

Compound viewmarks may be created, according to one embodiment, using traditional user interface features, such as a menu selection that permits association of one viewmark to another, a grouping construct (e.g., a box) that permits viewmarks to be associated, by dragging and dropping them onto each other, among other methods. Thus, for example, a user may easily construct, using conventional interface methods, a compound view that permits the user to more easily interact with the computer. Such a concept may be extended to other applications and interfaces that work non-optimally from a user point of view.

Also, according to another embodiment, a viewmark's "view" can be altered in place. For instance, if there was a viewmark which was zoomed in and it was decided that the viewmark should be zoomed out, then a control may be provided to allow the user to zoom out of the displayed viewmark. For instance, this may be accomplished by various keystrokes, such as holding the spacebar down and hitting the "+/−" sign keys, and zooming in/out, respectively. Likewise, panning can be performed with viewmarks to expose different areas of a view. In general, editor supported view options (e.g., panning, zooming, camera angle in 3-d, etc.) may be supported by the viewmark. For instance, dialogs fonts can be "zoomed" using the ctlr-+/− keystrokes. Likewise, a viewmark for a dialog could perform the same function.

Many other implementations are possible based on the exemplary embodiments described herein, and the list of features implementing viewmarks is not exhaustive.

Another aspect includes providing a capability of having active viewmarks which can be updated periodically. Viewmarks may be updated in real-time. Such a feature may be useful, for instance, in a graphical modeling environment such as Simulink or Stateflow environment wherein the contents of a model are often changing. Active viewmarks which may be used to represent views of such a changing model may be updated to reflect these changes either automatically or on demand.

Figure 8:
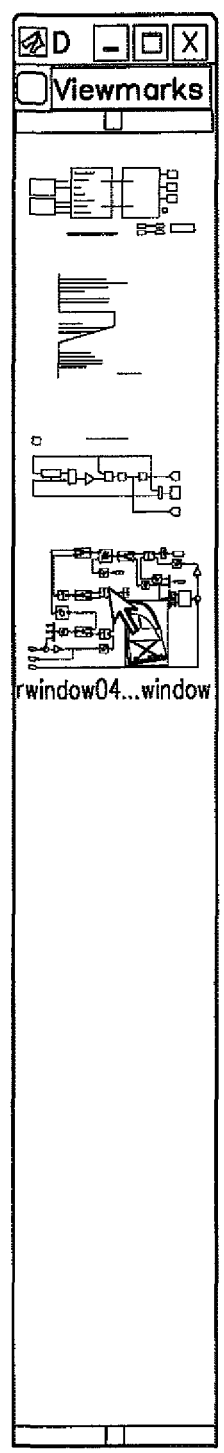
FIG. 8 shows another example interface that may be used to display viewmarks according to one embodiment.
Figure 9:
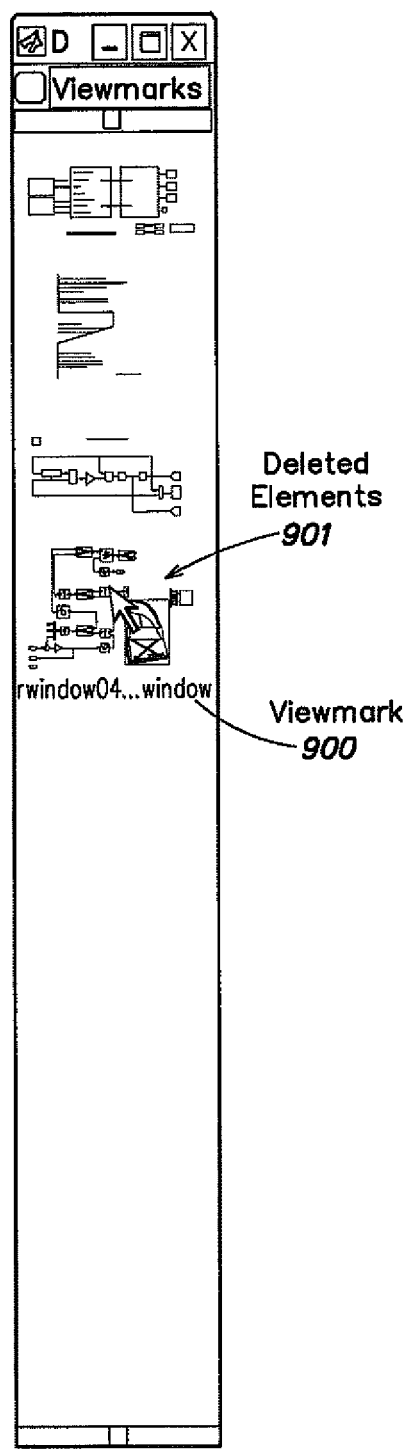
FIG. 9 shows another example interface that may be used to display viewmarks according to one embodiment wherein elements of a view represented by the displayed viewmark are changed.

Further, consider the case where a layer pointed to by a pointing device (e.g., a cursor indicated by an arrow) was open in an editor and was being modified by a user such as in the interface shown by way of example in FIG. 8. If one or more elements (blocks, lines, etc.) which are also in the view which the viewmark is representing are deleted (such as shown by deleted elements 901 of FIG. 9), this change may be reflected in the viewmark itself. Note that in the example shown in FIG. 9, the missing blocks and lines that were from viewmark 900 reflects the changes that occurred in the editor view.

In an embodiment, a user-specified setting may be used to specify whether a viewmark is in an active or passive mode. Viewmarks may be sensitive to any type of graphical change such as, but not limited to, color (e.g., sample time coloring), line thickness (e.g., wide vector lines), block annotations (data types), or other types of changes.

According to one embodiment, viewmarks may not be mere thumbnail representations of files on disk or even necessarily of whole layers, but may be used as live portals representing a "view" on model content. As such, several viewmarks could be used to view various aspects of the same layer. For example, there may exist a large statechart (which could not be shown in its entirety in the same display) and it may be beneficial to create viewmarks for several different clusters of states for debugging purposes. Such viewmarks may be shown in a group to allow the programmer to more easily see areas of interest in the chart, drawing, or other diagram type.

According to another aspect, it should be appreciated that any type of interface can be viewed using a viewmark. Examples of interface types include dialogs, spreadsheets, plots, scopes, array editors, code editors, text editors, human-machine interfaces (HMIs), and any type of user interface (UI) that can be put into a viewmark for easy access, navigation, and/or reconstitution.

Figure 10:
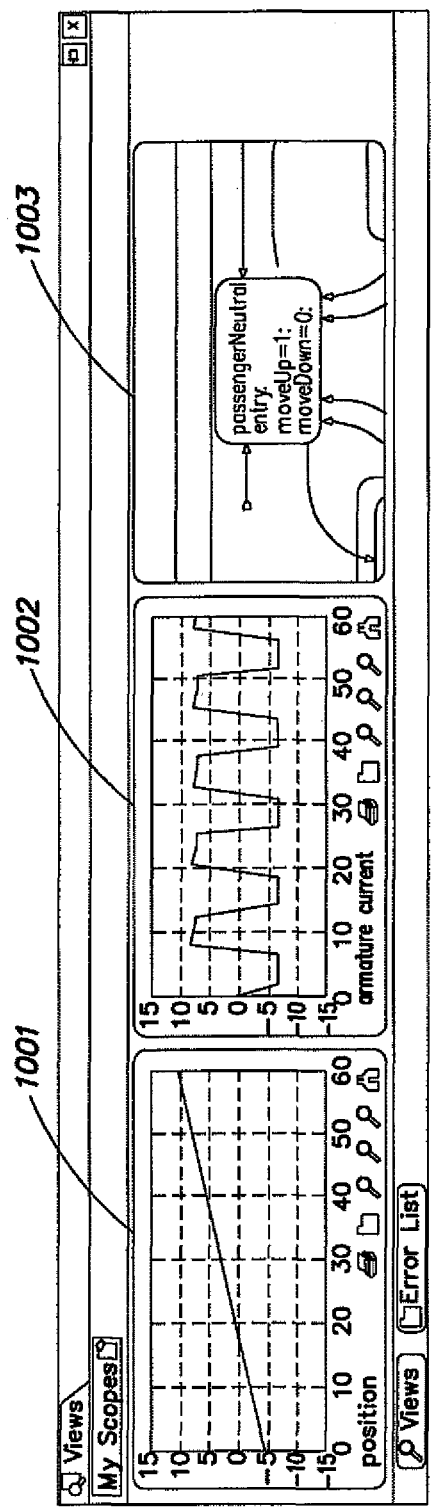
FIG. 10 shows another example interface that may be used to display viewmarks according to one embodiment.

FIG. 10 illustrates an example of two scope views (1001, 1002) and a view 1003 of a Stateflow diagram that are captured as viewmarks. In one embodiment, the viewmarks 1001-1003 may be displayed in an interface 1000 that is adapted to display multiple views.

Figure 11:
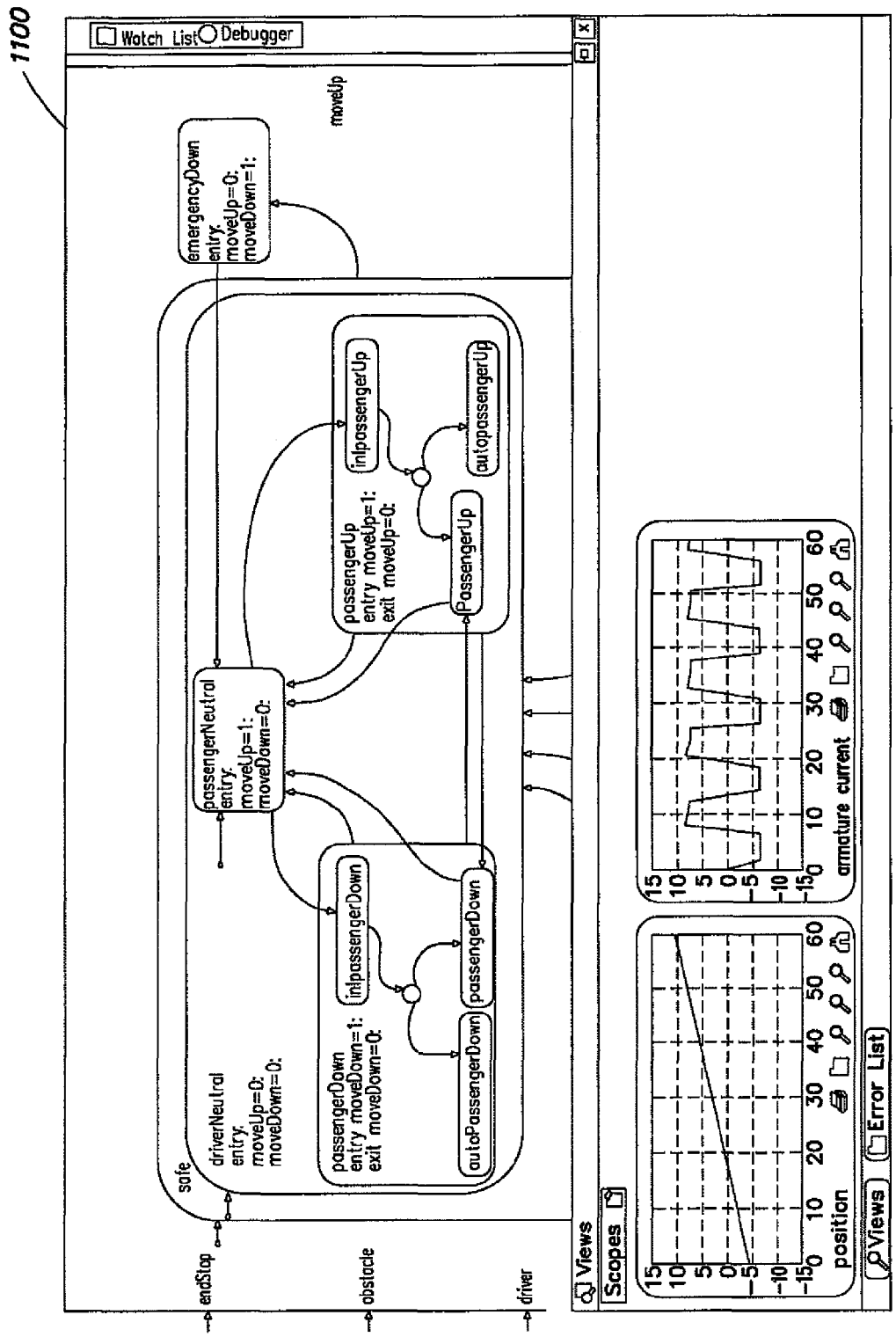
FIG. 11 shows an example interface showing an interface to be viewmarked according to one embodiment.
Figure 12:
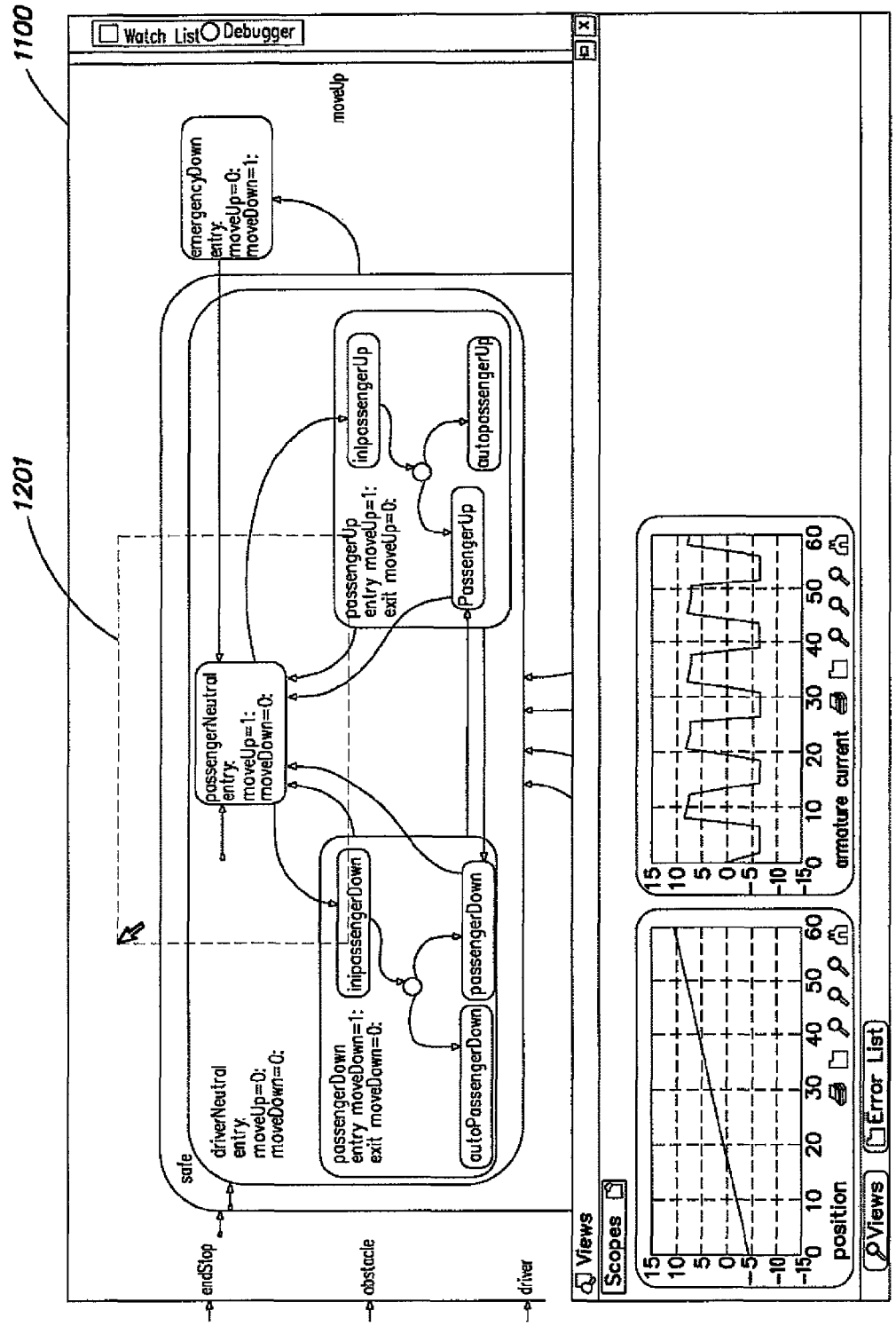
FIG. 12 shows an example interface wherein an area of the display to be viewmarked is selected.

The following example illustrates a technique that may be used to create such the Stateflow 1003 viewmark as shown in FIG. 10. As shown in FIG. 11, a portion of a Stateflow diagram 1100 may be used to create a viewmark. For instance, a user may navigate to a particular layer in a model hierarchy via an interface of the programming environment that displays diagram 1100. For example, diagram 1100 may be shown in an editor view.

Figure 13:
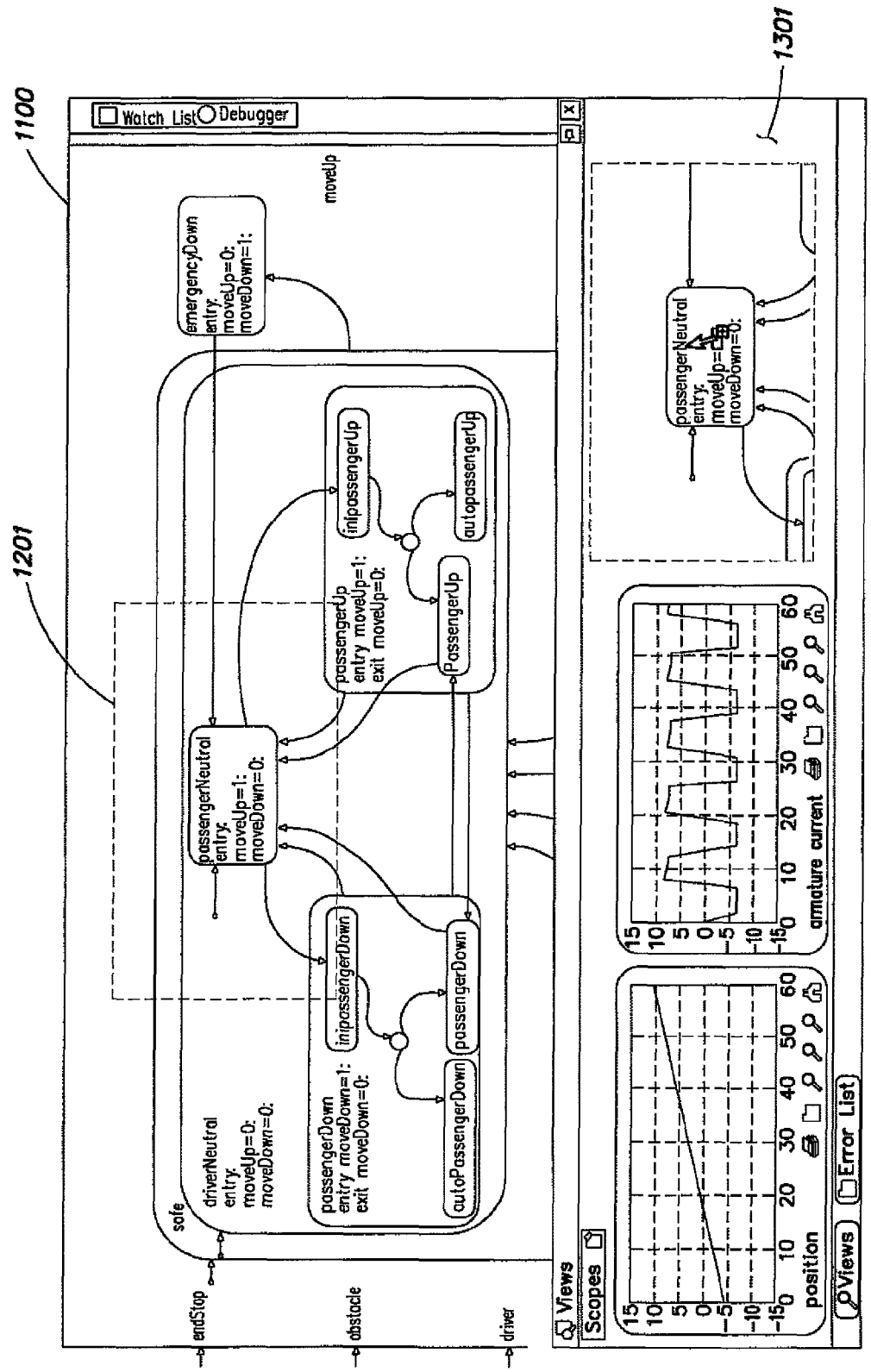
FIG. 13 shows an example interface wherein the selected view area in FIG. 12 is added to a list of views according to one embodiment.
Figure 14:
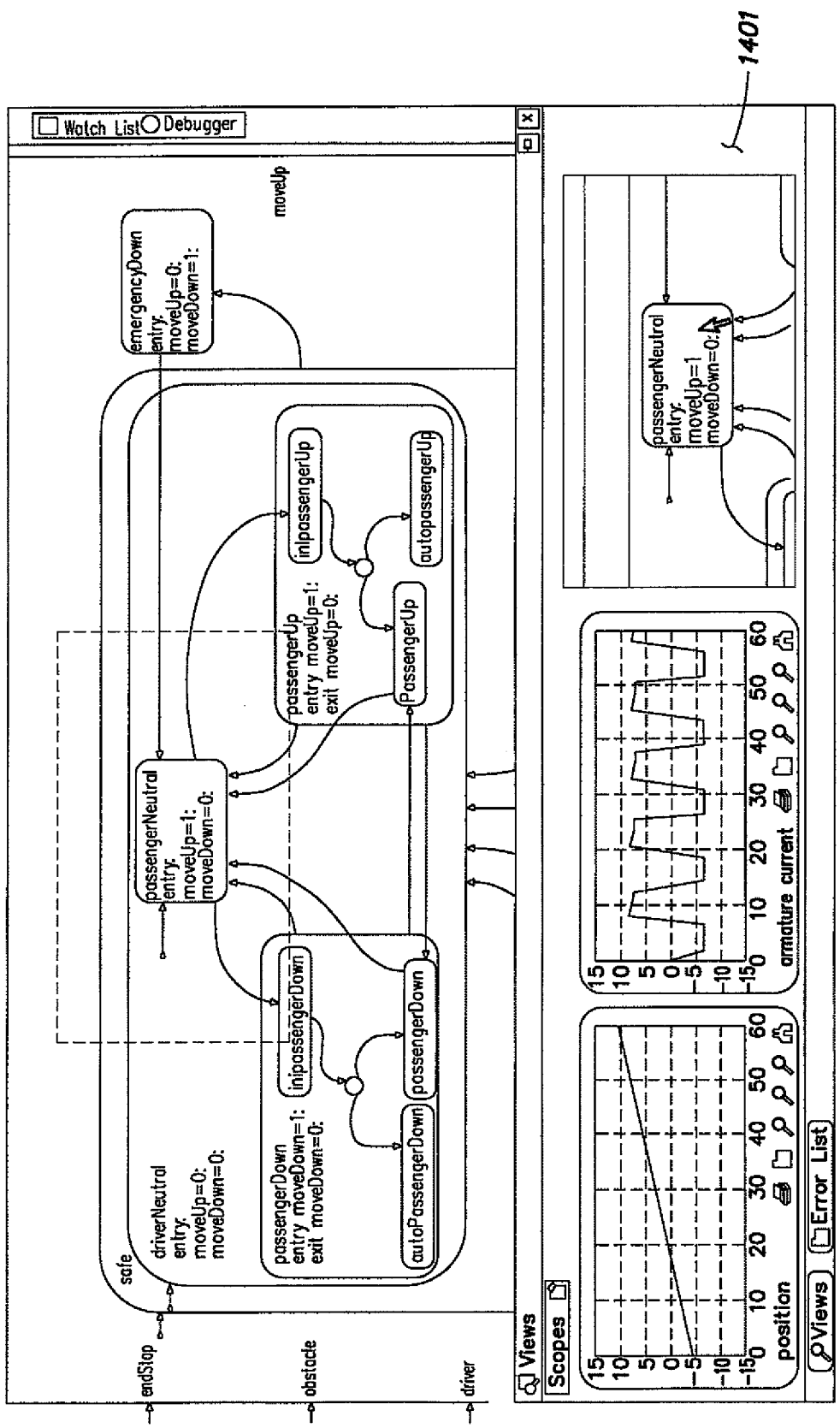
FIG. 14 shows an example interface showing an added viewmark according to one embodiment.

Next, a user may select an area of interest to viewmark within diagram 1100. For example, the user, by accessing a pointing device (e.g., a mouse) may define a region of diagram 1100 which is to be viewmarked. In particular, the user may drag a mouse cursor to define a boxed view enclosing an area of the diagram 1100 to be viewmarked. As shown in FIG. 13, the selected area 1201 may be dragged to an area 1301 within a list of views, and dropped into the area, creating a viewmark 1401 as shown by way of example in FIG. 14.

Figure 15:
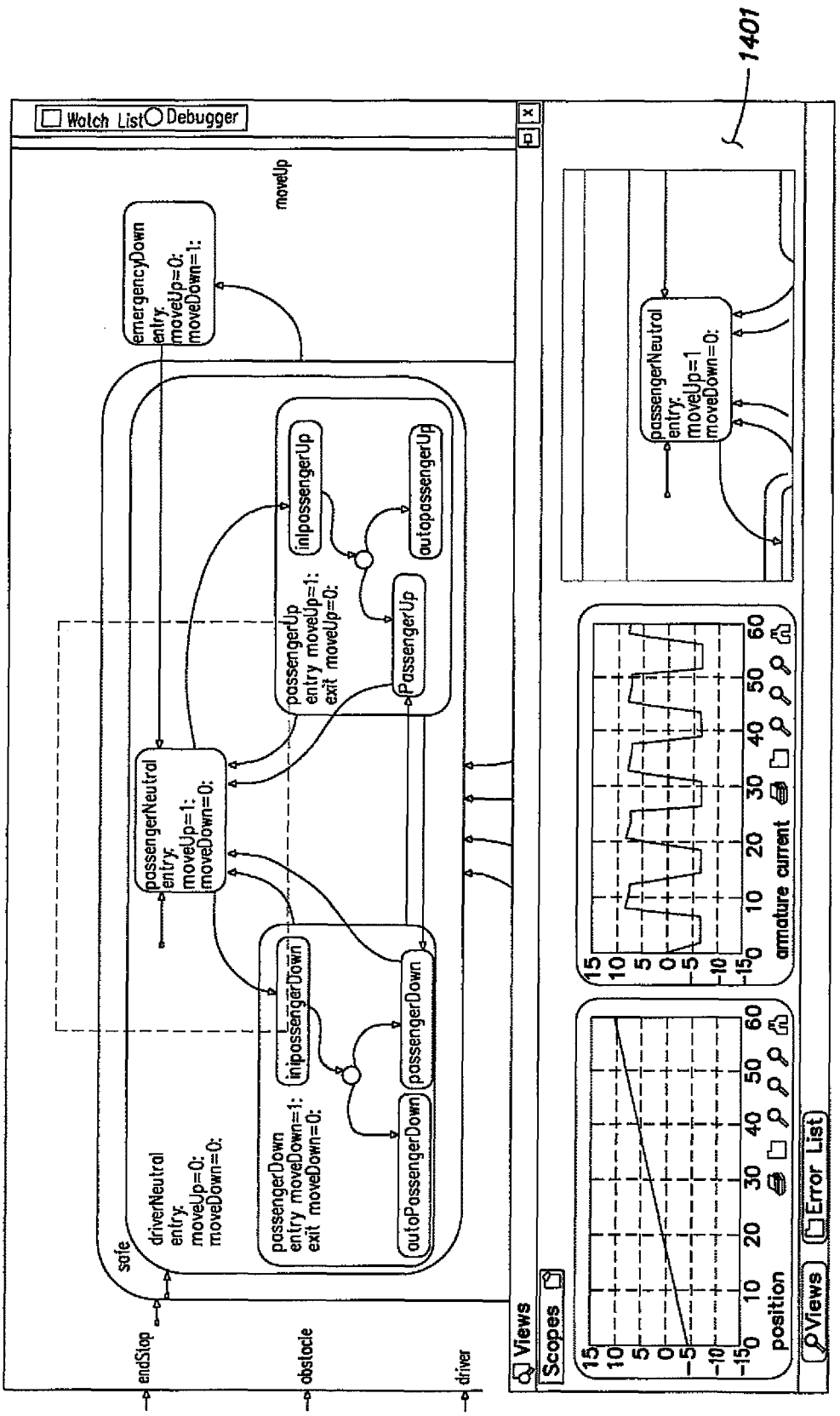
FIG. 15 shows an example interface showing a viewmark that is updated with changes in an originating view.
Figure 16:
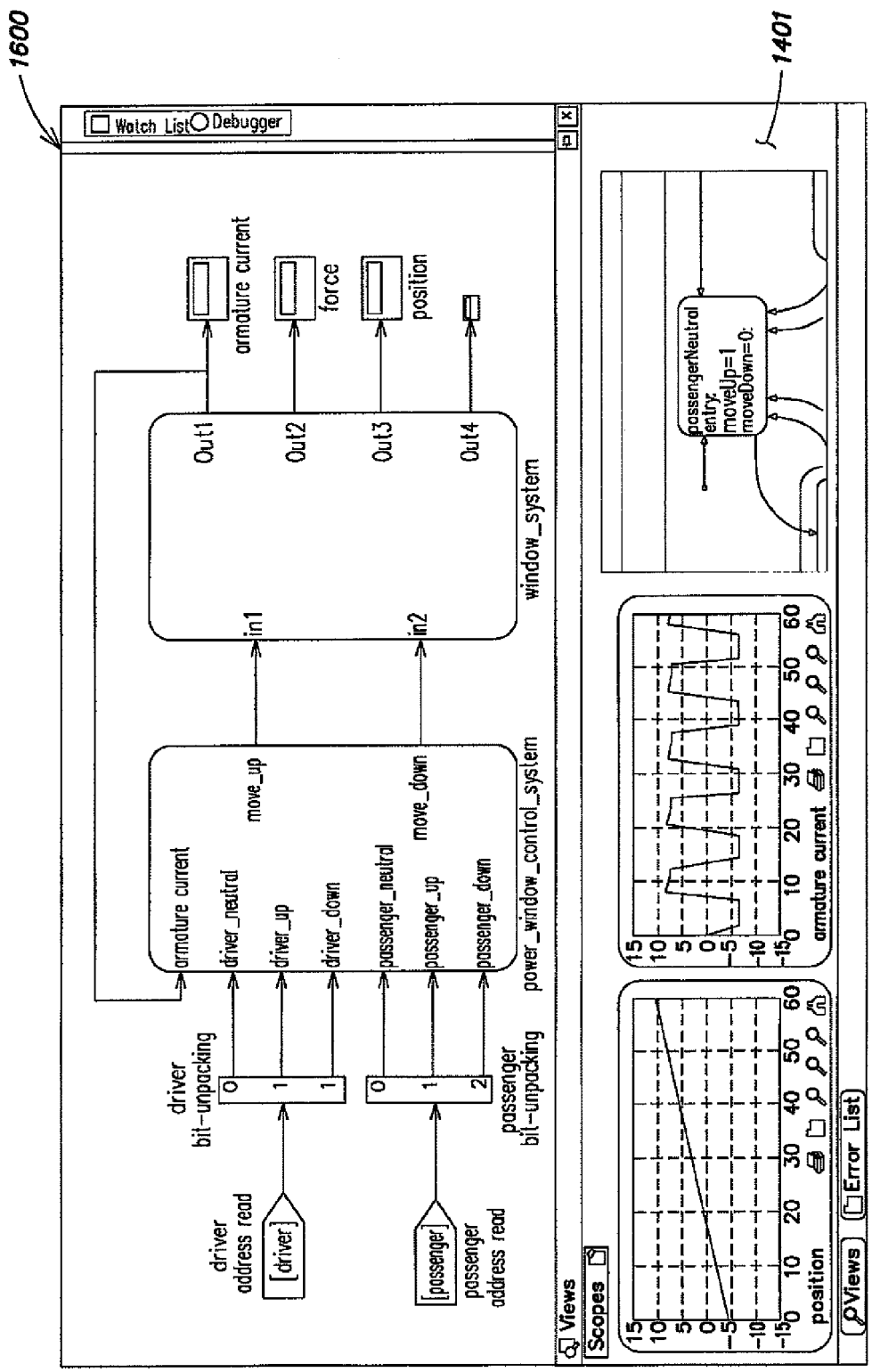
FIG. 16 shows an example interface showing the viewmark as shown in FIG. 15 being updated even though the currently-displayed view has changed.

Further, according to one embodiment shown in FIG. 15, viewmark 1401 just created using the process described above may be an active viewmark. In one example, a simulation may be started which can animate the activity of states within the state diagram. For instance, colors or other indicators may be used to indicate one or more states within a particular diagram. It should be appreciated that one benefit of a viewmark includes the ability to monitor a particular view represented by the viewmark. For instance, if the user navigates an editor program to some other view 1600 as shown in FIG. 16, the viewmark 1401 may continue to view a "passengerneutral" state and allow the user to observe its activity.

This is just one example showing a viewmark creation and selection method according to various embodiments using a drag-and-drop interface method. However, it should be appreciated that other interface methods may be used to create a viewmark such as, for example, using menu selection, command line specification, programmatic creation, among other creation methods.

Further still, viewmarks can also be used to store entire window configurations in the form of a set of views, referred to herein as a "viewset". For instance, assume that there is a somewhat complicated model, and there are a certain set of views that a programmer wants to look at when working on the model and a different set of views the programmer would like to look at when working on the controller. One aspect relates to capturing as a viewmark, a cluster of views (referred to as a viewset) which enables one to revisit multiple views at a later time. These multiple views may also have a stored arrangement, among other settings, which may be stored and retrieved when accessed. Further, these cluster views may also have viewmarks that are active.

Figure 17:
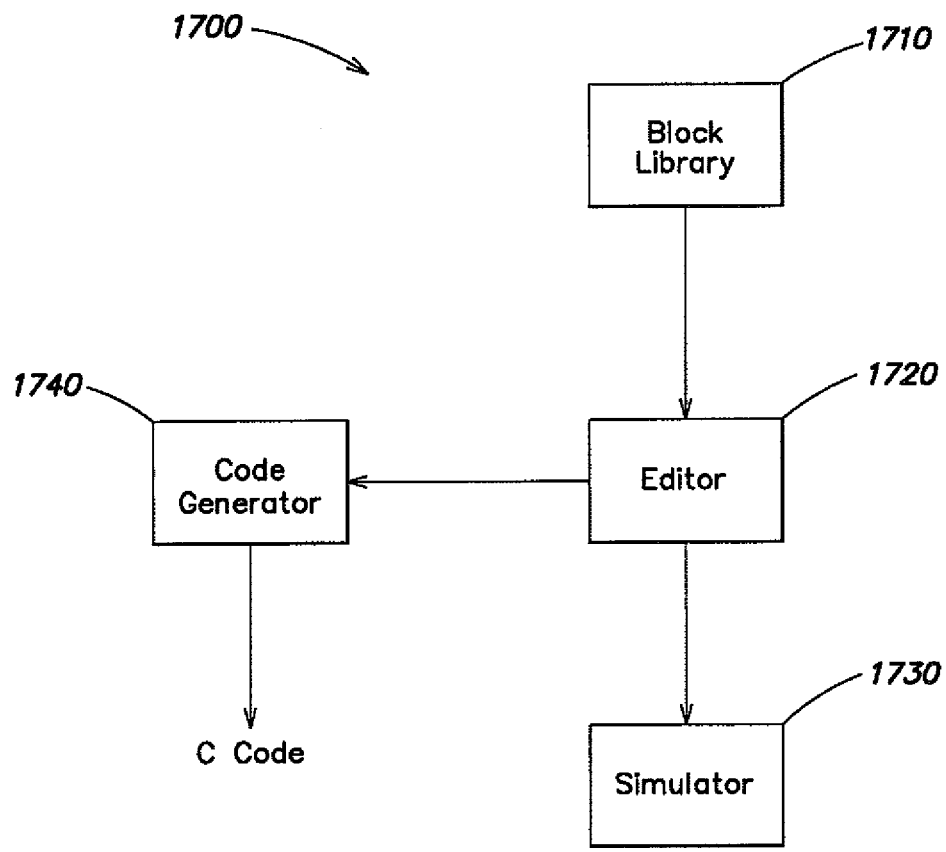
FIG. 17 shows an example graphical programming environment in which various aspects may be practiced.

According to one embodiment, various aspects may be implemented in a graphical programming environment that uses blocks to represent models. FIG. 17 shows an exemplary graphical programming environment in which blocks may be utilized to represent models according to one embodiment. Environment 1700 includes a block library block 1710, an editor 1720, a simulator 1730 and a code generator 1740. Further, a code generator 1740 may be provided that is capable of generating source code for the models according to one embodiment.

Block library 1710 contains blocks of application specific models that may support the modeling and simulation of systems. Blocks in the block library 1710 may be incorporated into the models of the systems designed using modeling and simulation tool 1730. The blocks provided from the block library 1700 may be represented generally by rectangular blocks according to one embodiment. However, one of skill in the art will appreciate that the models can be represented in other graphical symbols or textual symbols.

The model blocks provided by the block library 1710 may include a block processing block for processing input data. The block library 1710 may also include component blocks of the block processing block that may be combined to implement a block processing function. Block processing according to one embodiment may be implemented in multiple blocks that may include components of the block processing block. According to one embodiment, block library 1710 may include Simulink® Blocksets, such as DSP blockset, Fixed-point Blockset and Communications Blockset, commercially available from the The MathWorks, Inc. The Simulink® Blocksets provide models and utilities for the development and integration of models for target systems and sub-systems of the target systems.

Editor 1720 and simulator 1730 may provide a graphical simulation and prototyping environment for modeling, simulating, and analyzing target systems. Editor 1720 incorporates the blocks provided from block library 1710 into the target systems. The target systems designed in editor 1720 may be simulated by simulator 1730 to analyze the behavior of the designed target systems. Exemplary editor 1720 and simulator 1730 may be found, for example, in the Simulink® product, available commercially from The MathWorks, Inc., Natick, Mass.

As discussed, the graphical programming environment enables users to design a block diagram for a target system, simulate the system's behavior, analyze the performance of the system, and refine the design of the system. The environment may also allow users to design target systems through a user-interface that allows drafting of block diagram models of the target systems. Blocks in block library 1710 may be made available to users when the users are building the block diagram of the target systems.

Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from block library 1710 and dropped on to a window (e.g., a model canvas). The block diagram programming environment may include a block diagram editor that allows users to perform such actions as draw, edit, annotate, save, and print out block diagram representations of target systems.

The block diagram editor may be a graphical user interface (GUI) component that allows drafting of block diagram models by users. The block diagram programming environment may also provide a textual interface with a set of commands that allow interaction with the graphical editor. Using this textual interface, users may write special scripts that perform automatic editing operations on the block diagram. The environment may also provide users an ability to simulate the designed target systems to determine the behavior of the systems. Further, the environment may include a block diagram execution engine that may carry out the task of compiling and linking the block diagram to produce an "in-memory executable" version of the model that may be used for generating code and/or simulating a block diagram model.

The code generator 1740 may generate, for example, customizable C-code directly from the block diagrams of the models designed using the editor 1720. Although it should be appreciated that C-language code may be generated, it should be appreciated that any other type of code may be generated. For example, Hardware Descriptive Language (HDL), ADA, Java, JavaScript, Python, or other code types may be generated. By automatically generating source code, the code generator 1740 may enable rapid prototyping, hardware-in-the loop simulations, and desktop rapid simulation on the models designed in the editor 1720. Code generation tool 1740 may generate efficient source code for embedded systems applications. It should be noted that source code shown in FIG. 17 is an illustrative code that may be generated in the code generator 1740, and the code generator 1740 may generate different code for the models in one or more programming languages, such as Ada. Real-Time Workshop from The MathWorks, Inc., is one example code generation tool that may be used as code generator 1740.

One of skill in the art will appreciate that the graphical programming environment 1700 is not limited to block diagram programming environments, but rather includes any other graphical programming environments, such as state flowchart graphical programming environments. For instance, the Stateflow® product from The MathWorks, Inc., may provide a graphical environment for modeling and designing event-driven models. The Stateflow® product may enable users to generate state flowcharts that graphically represent hierarchical and parallel states and the event-driven transitions between the states of the models. The Simulink® product, which is interfaced with the Stateflow® product, may be used to execute the models and analyze the behavior of the models based on, for example, state flowcharts created by the Stateflow® product.

Figure 18:
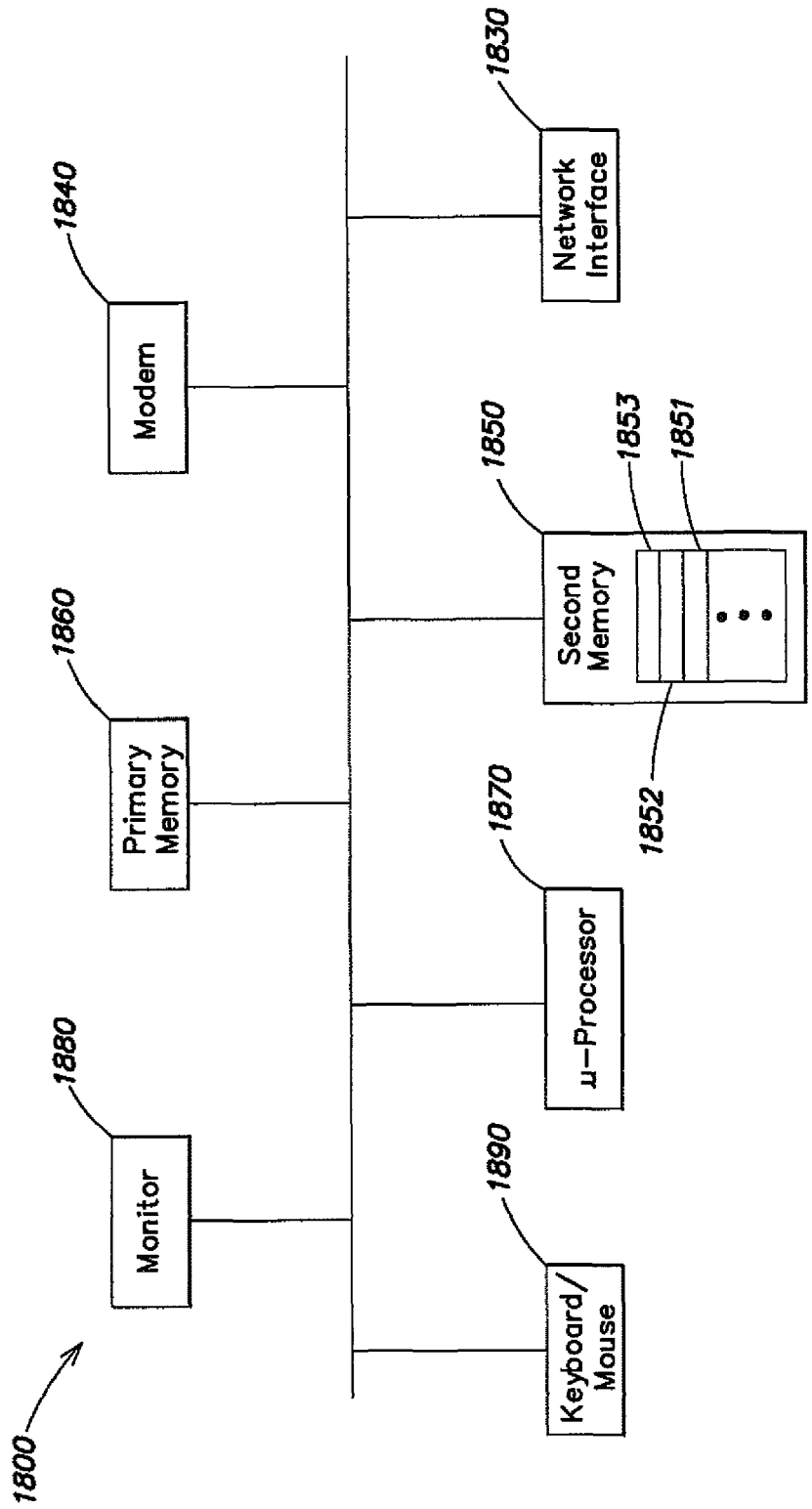
FIG. 18 shows a general-purpose computer system suitable for practicing various aspects.

FIG. 18 is an exemplary electronic device 1800 that may be used for practicing various aspects. Such a device 1800 may be, for example, a general purpose computing device such as a personal computer (PC), but it should be appreciated that any computing device type may be used.

Electronic device 1800 includes a network interface 1830, a MODEM 1840, a secondary memory 1850, a primary memory 1860, a microprocessor 1870, a monitor 1880 and a keyboard/mouse 1890 or any other type of interface (e.g., a microphone, camera, neural input, etc.). Microprocessor 1870 comprises logic that may be configured to control each component of the electronic device 1800 to run the software tools in the graphical programming environment 1700. Electronic device 1800 may receive the data necessary for controlling the design and simulation of a target system through the keyboard/mouse 1890. The data may include control data that may be used to set up operation modes of a block processing block.

Monitor 1880 may display a result generated in the graphical programming environment 1800. Primary memory 1860 may fetch from secondary memory 1850 and provide codes to the microprocessor 1870. The codes may be executed by the microprocessor 1870 to operate the electronic device 1800 and to run the graphical programming environment 1700. Secondary memory 1850 may contain software tools for applications. Secondary memory 1850 may include, in particular, code 1851 for the block library 1710, code 1852 for editor 1720, and code 1853 for simulator 1730. Network interface 1830 and MODEM 1840 enable the electronic device 1800 to communicate with other electronic devices through communication networks, such as Internet, intranet, LAN (Local Area Network), WAN (Wide Area Network) or any other type of communication network. Further, communication facilities may support for the distributed implementations.

Although the examples above have been described relative to a Simulink® block diagram model, it should be appreciated that aspects may be practiced relative to models implemented in other graphical modeling environments, including but not limited to LabVIEW available from National Instruments Corporation of Austin, Tex., and Rational Rose available from International Business Machines of White Plains, N.Y.

What is claimed is:

1. A method comprising:
   storing view-specific information for a graphical model,
      the view-specific information identifying at least one view, of a plurality of views, of the graphical model presented within an interface provided by a computing device, and
      storing the view-specific information being performed by the computing device;
   storing information identifying a state associated with the at least one view,
      storing the information identifying the state being performed by the computing device;
   providing a graphical representation of the view-specific information for display,
      providing the graphical representation being performed by the computing device;
   detecting an action relating to the graphical representation of the view-specific information,
      detecting the action being performed by the computing device;
   providing, based on the action, the at least one view of the graphical model for display within the interface,
      providing the at least one view of the graphical model being performed by the computing device; and
   setting, based on the information identifying the state associated with the at least one view, the graphical model to the state associated with the at least one view of the graphical model,
      setting the graphical model to the state associated with the at least one view being performed by the computing device.

2. The method of claim 1, where the at least one view includes a group of elements included in the graphical model, and
   where providing the graphical representation of the view-specific information includes:
      providing, for display, a graphical representation of the group of elements.

3. The method of claim 1, where providing the graphical representation of the view-specific information includes:
   providing, for display, the graphical representation of the view-specific information in conjunction with a view, of the plurality of views, that is different from the at least one view.

4. The method of claim 1, further comprising:
   determining that the at least one view has been updated;
   modifying, based on the at least one view having been updated, the graphical representation of the view-specific information to form a modified graphical representation of the view-specific information; and
   providing the modified graphical representation of the view-specific information for display.

5. The method of claim 1, where providing the graphical representation of the view-specific information includes:
    providing a textual representation of the view-specific information for display.
6. The method of claim 1, where the action relating to the graphical representation of the view-specific information is a first action, the method further comprising:
    detecting a second action relating to the graphical representation of the view-specific information; and
    providing, based on the second action, a textual representation of the view-specific information for display.
7. The method of claim 6, where the second action is detected prior to detecting the first action.
8. A device comprising:
    one or more processors to:
        store view-specific information for a graphical model,
            the view-specific information identifying at least one view, of a plurality of views, of the graphical model presented within an interface;
        store information indicating a state of the graphical model,
            the state of the graphical model being associated with the at least one view of the graphical model;
        present, for display, a graphical representation of the view-specific information;
        detect an action relating to the graphical representation of the view-specific information;
        present, for display and based on the action, the at least one view of the graphical model within the interface; and
        set, based on presenting the at least one view of the graphical model for display, the graphical model to the state of the graphical model associated with the at least one view of the graphical model.
9. The device of claim 8, where, when presenting the graphical representation of the view-specific information, the one or more processors are to:
    present, for display and based on the view-specific information, a thumbnail image of the at least one view.
10. The device of claim 8, where, when presenting the graphical representation of the view-specific information, the one or more processors are to:
    present, for display, the graphical representation of the view-specific information in conjunction with another view of the plurality of views,
        the other view being different from the at least one view.
11. The device of claim 8, where the one or more processors are further to:
    detect a modification to the at least one view; and
    modify the graphical representation of the view-specific information based on the modification.
12. The device of claim 8, where, when presenting the graphical representation of the view-specific information, the one or more processors are to:
    present, for display, a textual representation of the view-specific information.
13. The device of claim 12, where the action relating to the graphical representation of the view-specific information includes a first action, and
    where, when presenting the textual representation of the view-specific information, the one or more processors are to:
        detect a second action relating to the graphical representation of the view-specific information, and
        present, for display, the textual representation of the view-specific information based on the second action.

14. The device of claim 13, where the second action is detected prior to the first action being detected.
15. A non-transitory computer readable medium storing instructions, the instructions comprising:
    one or more instructions that, when executed by one or more processors, cause the one or more processors to:
        provide a view, of a plurality of views, of a graphical model for display;
        store, based on providing the view of the graphical model for display, view-specific information associated with the view of the graphical model and information identifying a state of the graphical model,
            the state of the graphic model being associated with the view of the graphical model;
        provide, based on storing the view-specific information and the information identifying the state of the graphical model, a graphical representation of the view-specific information;
        receive an input associated with the graphical representation of the view-specific information;
        provide, based on the input, the view of the graphical model for display; and
        set, based on providing the view of the graphical model for display, the graphical model to the state of the graphical model associated with the view of the graphical model.
16. The non-transitory computer readable medium of claim 15, where the one or more instructions to provide the graphical representation of the view-specific information include:
    one or more instructions that, when executed by the one or more processors, cause the one or more processors to provide the graphical representation of the view-specific information in conjunction with another view of the plurality of views of the graphical model.
17. The non-transitory computer readable medium of claim 15, where the view of the graphical model includes one or more of:
    a group of elements included in the graphical model,
    one or more screen views, or
    one or more graphical windows.
18. The non-transitory computer readable medium of claim 15, where the view includes one or more model elements included in the graphical model; and
    where the one or more instructions to provide the graphical representation of the view-specific information include:
        one or more instructions that, when executed by the one or more processors, cause the one or more processors to display provide, for display, an image depicting the one or more model elements.
19. The non-transitory computer readable medium of claim 15, where the instructions further comprise:
    one or more instructions that, when executed by the one or more processors, cause the one or more processors to:
        determine an update to the view;
        modify, based on the update, the graphical representation of the view-specific information; and
        provide the modified graphical representation of the view-specific information for display.
20. The non-transitory computer readable medium of claim 15, where the input comprises a first input, the instructions further comprising:
    one or more instructions that, when executed by the one or more processors, cause the one or more processors to:
        receive a second input associated with the graphical representation of the view-specific information; and provide, based on the second input, a textual representation of the view-specific information for display.

* * * * *

UNITED STATES PATENT AND TRADEMARK OFFICE
CERTIFICATE OF CORRECTION

PATENT NO. : 9,262,060 B1  
APPLICATION NO. : 13/970196  
DATED : February 16, 2016  
INVENTOR(S) : Jay Ryan Torgerson Page 1 of 1

It is certified that error appears in the above-identified patent and that said Letters Patent is hereby corrected as shown below:

In the Claims

Please correct Claim 18 as follows:

Column 20, line 50, after "to" delete "display".

Signed and Sealed this
Seventh Day of June, 2016

Michelle K. Lee
*Director of the United States Patent and Trademark Office*